US010572963B1

(12) United States Patent
Cinnamon et al.

(10) Patent No.: US 10,572,963 B1
(45) Date of Patent: Feb. 25, 2020

(54) DETECTION OF ITEMS

(71) Applicant: Synapse Technology Corporation, Sherman Oaks, CA (US)

(72) Inventors: Ian Cinnamon, Sherman Oaks, CA (US); Bruno Brasil Ferrari Faviero, Coconut Creek, FL (US); Simanta Gautam, Charlottesville, VA (US)

(73) Assignee: Synapse Technology Corporation, Palo Alto, CA (US)

( * ) Notice: Subject to any disclaimer, the term of this patent is extended or adjusted under 35 U.S.C. 154(b) by 128 days.

(21) Appl. No.: 15/714,932

(22) Filed: Sep. 25, 2017

Related U.S. Application Data

(60) Provisional application No. 62/532,821, filed on Jul. 14, 2017, provisional application No. 62/532,865, filed on Jul. 14, 2017.

(51) Int. Cl.

| | |
|---|---|
| ***G06Q 50/26*** | (2012.01) |
| ***G06T 7/00*** | (2017.01) |
| ***G06T 7/62*** | (2017.01) |
| ***G06T 1/00*** | (2006.01) |

(52) U.S. Cl.
CPC ......... *G06Q 50/265* (2013.01); *G06T 1/0007* (2013.01); *G06T 7/0004* (2013.01); *G06T 7/62* (2017.01)

(58) Field of Classification Search
CPC ... G06Q 50/265; G06T 1/0004; G06T 1/0007; G06T 7/62
See application file for complete search history.

(56) References Cited

U.S. PATENT DOCUMENTS

| | | | |
|---|---|---|---|
| 5,128,365 | A | 7/1992 | Spector et al. |
| 5,600,303 | A | 2/1997 | Husseiny et al. |
| H002110 | H | 10/2004 | Newman et al. |
| 6,825,854 | B1 | 11/2004 | Beneke et al. |

(Continued)

FOREIGN PATENT DOCUMENTS

| | | | |
|---|---|---|---|
| CA | 2651131 | A1 | 11/2007 |
| CA | 2796809 | A1 | 10/2011 |

(Continued)

OTHER PUBLICATIONS

Girshick, Ross ("Fast R-CNN," IEEE International Conference on Computer Vision, Dec. 7-13, 2015) (Year: 2015).*

(Continued)

*Primary Examiner* — Yubin Hung
(74) *Attorney, Agent, or Firm* — Lee Sullivan Shea & Smith LLP

(57) ABSTRACT

According to an aspect, a system comprises at least one processor, a memory, and a non-transitory computer-readable storage medium storing instructions. The stored instructions are executable to cause the at least one processor to: receive a digital image that represents an object scanned by a detection device, determine a region of the digital image that is likely to contain an item, transform the region of the digital image to an embedding, classify, based on the embedding, the region as containing a known class of known item, and responsive to classifying the region as containing the known class of item: generate a graphical representation based on the known class of item.

20 Claims, 16 Drawing Sheets
(9 of 16 Drawing Sheet(s) Filed in Color)

400

402 RECEIVE A DIGITAL IMAGE

404 DETERMINE A BOUNDING BOX FROM THE DIGITAL IMAGE

406 TRANSFORM THE CONTENTS OF THE BOUNDING BOX OF THE DIGITAL IMAGE TO AN EMBEDDING

408 CLASSIFY THE CONTENTS OF THE BOUNDING BOX AS CONTAINING A KNOWN CLASS OF ITEM BASED ON THE EMBEDDING

410 GENERATE A GRAPHICAL REPRESENTATION CORRESPONDING TO THE KNOWN CLASS OF ITEM

(56) References Cited

U.S. PATENT DOCUMENTS

| | | | |
|---|---|---|---|
| 7,277,577 B2 | 10/2007 | Ying et al. | |
| 7,702,068 B2 | 4/2010 | Scheinman et al. | |
| 8,014,493 B2 | 9/2011 | Roux et al. | |
| 8,494,210 B2 | 7/2013 | Gudmundson et al. | |
| 8,633,823 B2 | 1/2014 | Armistead, Jr. et al. | |
| 8,875,226 B1* | 10/2014 | Marek | G06F 21/84 713/166 |
| 9,042,511 B2 | 5/2015 | Peschmann | |
| 9,042,661 B2 | 5/2015 | Pavlovich et al. | |
| 9,170,212 B2 | 10/2015 | Bouchard et al. | |
| 2002/0159627 A1 | 10/2002 | Schneiderman et al. | |
| 2004/0066966 A1 | 4/2004 | Schneiderman | |
| 2005/0117700 A1 | 6/2005 | Peschmann | |
| 2006/0088207 A1 | 4/2006 | Schneiderman | |
| 2006/0197523 A1 | 9/2006 | Palecki | |
| 2007/0112556 A1* | 5/2007 | Lavi | G06F 17/277 704/9 |
| 2008/0063140 A1 | 3/2008 | Awad | |
| 2008/0170660 A1 | 7/2008 | Gudmundson | |
| 2008/0283761 A1 | 11/2008 | Robinson | |
| 2010/0046704 A1 | 2/2010 | Song et al. | |
| 2012/0304085 A1* | 11/2012 | Kim | G08B 13/19671 715/763 |
| 2013/0163811 A1 | 6/2013 | Oelke | |
| 2013/0215264 A1 | 8/2013 | Soatto | |
| 2013/0294574 A1 | 11/2013 | Peschmann | |
| 2013/0322742 A1 | 12/2013 | Walton et al. | |
| 2014/0344533 A1 | 11/2014 | Liu et al. | |
| 2016/0098620 A1* | 4/2016 | Geile | G06K 9/469 382/103 |
| 2016/0117898 A1 | 4/2016 | Kuznetsov et al. | |
| 2016/0189509 A1* | 6/2016 | Malhotra | G08B 25/009 340/541 |
| 2016/0216398 A1 | 7/2016 | Bendahan et al. | |
| 2016/0232689 A1 | 8/2016 | Morton | |
| 2017/0061625 A1 | 3/2017 | Estrada et al. | |
| 2017/0083792 A1 | 3/2017 | Rodriguez-Serrano et al. | |
| 2017/0116511 A1 | 4/2017 | Kim et al. | |
| 2017/0236232 A1 | 8/2017 | Morton | |
| 2017/0278300 A1 | 9/2017 | Hurter | |
| 2017/0316285 A1 | 11/2017 | Ahmed et al. | |
| 2017/0350834 A1 | 12/2017 | Prado | |
| 2018/0150713 A1 | 5/2018 | Farooqi | |
| 2018/0351634 A1* | 12/2018 | Ryan | H04B 7/18506 |

FOREIGN PATENT DOCUMENTS

| | | |
|---|---|---|
| JP | 103997 A | 11/1992 |
| JP | 2010520542 A | 6/2010 |
| JP | 2017062781 A | 3/2017 |
| WO | 2006119603 A1 | 11/2006 |
| WO | 2008107112 A2 | 9/2008 |
| WO | 2010050952 A1 | 5/2010 |

OTHER PUBLICATIONS

Salvador et al. ("Faster R-CNN Features for Instance Search," IEEE Conference on Computer Vision and Pattern Recognition Workshops (CVPRW), Jun. 26-Jul. 1, 2016) (Year: 2016).*

Shaoqing, et al., "Faster R-CNN: Towards Real-Time Object Detection with Region Proposal Networks," IEEE Transactions on Pattern Analysis and Machine Intelligence, vol. 39, No. 6, Jun. 1, 2017, pp. 1137-1149.

Akcay, et al., "Transfer Learning Using Convolutional Neural Networks for Object Classification Within X-Ray Baggage Security Imagery," IEE International Conference on Image Processing (ICIP), Sep. 25, 2016, pp. 1057-1061.

European Patent Office, European Extended Search Report dated Nov. 27, 2018, issued in connection with European Patent Application No. 18183573.7, 11 pages.

He et al. "Mask R-CNN," Facebook AI Research (FAIR) Apr. 5, 2017, 10 pages.

He et al. "Deep Residual Learning for Image Recognition," Microsoft Research Dec. 10, 2015, 12 pages.

Simonyan et al. "Very Deep Convolutional Networks for Large-Scale Image Recognition," Visual Geometry Group, Department of Engineering Science, University of Oxford, Apr. 10, 2015, 14 pages.

Ren et al. "Faster R-CNN: Towards Real-Time Object Detection with Region Proposal Networks," Jan. 6, 2016, 14 pages.

Steitz et al. "Multi-view X-ray R-CNN," Department of Computer Science, TU Darmstadt, Darmstadt, Germany, Oct. 4, 2018, 16 pages.

Girshick et al. "Rich feature hierarchies for accurate object detection and semantic segmentation," Tech report (v5), UC Berkeley, Oct. 22, 2014, 21 pages.

Girschick, Ross "Fast R-CNN," Microsoft Research, Sep. 27, 2015, 9 pages.

Krizhevsky et al. "ImageNet Classification with Deep Convolutional Neural Networks," 9 pages.

Liu et al. "SSD: Single Shot MultiBox Detector," Dec. 29, 2016, 17 pages.

Lin et al. "Focal Loss for Dense Object Detection," Facebook AI Research (FAIR), Feb. 7, 2018, 10 pages.

Lin et al. "Microsoft COCO: Common Objects in Context," Feb. 21, 2015, 15 pages.

Lin et al. "Feature Pyramid Networks for Object Detection," Facebook AI Research (FAIR), Cornell University and Cornell Tech, Apr. 19, 2017, 10 pages.

Lin et al. "Cross-View Image Geolocalization," University of California, Brown University, 8 pages.

Redmon et al. "You Only Look Once: Unified, Real-Time Object Detection," 10 pages.

* cited by examiner

DETECTION OF ITEMS

CROSS REFERENCE TO RELATED APPLICATIONS

This application claims priority to U.S. Provisional Patent Application No. 62/532,821, filed on Jul. 14, 2017, and U.S. Patent No. 62/532,865, filed on Jul. 14, 2017, the contents of each of these applications are hereby incorporated by reference in their entirety.

FIELD OF THE DISCLOSURE

The disclosure is generally related to screening security systems for use in public or private applications and, more particularly, to methods, systems, devices, and other elements directed to screening an object to facilitate the identifications of an item located therein.

BACKGROUND

Most people are familiar with the current user experience of walking through security at an airport prior to departure. After flight check-in, machines deep inside the airport scan checked bags to detect explosives. Since prohibited items in checked baggage almost exclusively encompass explosives, the machines can scan these bags more efficiently than at the checkpoint.

Next, the passenger goes to a Transportation Security Administration (TSA) checkpoint, where a machine, such as an x-ray or CT scanner, scans carry-on objects, like a bag, laptop, equipment, or a tray containing various items. Today's standard scanners across most airports use single-view x-ray technology, through which operators see a top-down view of baggage as it passes through the machine. Recent innovations in imaging hardware include multi-view x-rays, multi-spectral x-rays, and CT technology to provide 3-dimensional, or other multi-dimensional views of baggage. Using any of these technologies, human screening operators seek to find prohibited items including firearms, knives and other sharps, explosives, liquids, and other prohibited items.

More specifically, as a bag enters the scanner, the device captures an image of the bag, representing positional elements (coordinates), z-effective number, and x-ray attenuation, among other data. Using this data, material and density approximations are determined. The image is projected onto a screen, often color-coded to indicate the type of material that each item could possibly be comprised of, based on the density approximations (organic, metal, etc.). This image is analyzed by a human screening officer, whose job it is to identify any prohibited items in the bag. The human operator has a few inputs including the opportunity to start or stop the conveyor belt, and the ability to change the coloring of the image to highlight metallic or organic items (e.g., based on density).

Human-assist tools that attempt to automatically identify threats in the bag are not widely deployed, and most checkpoint scanners do not make use of them. The few Automated Threat Recognition algorithms that do exist use outdated algorithms for comparing regions to a threat database ("pixel matching" or similar), or hard-coded basic metrics for determining threatening areas (e.g. very high-density regions that could be explosives). These systems are often closed, with the only inputs being the operator, the x-ray, and maybe a basic classification engine and they are not connected to any broader network. These systems also do not communicate—the AIT scanner, explosive trace detector, and baggage scanner exist separately, unaware of each other's assessment of the same passenger or their baggage.

In 2016, the US Transportation Security Agency (TSA) screened over 700 million passengers, 450 million checked bags, and 1.6 billion carry-on bags. In those bags, the TSA discovered around 3,000 firearms, 80% of which were loaded. In a world where a plane can be overtaken with small knives, every threat is a potential disaster. Firearms detected by the TSA are expected to increase 15-20% per year. With passengers expected to increase 4-10% per year, the problem will only worsen.

Published research shows that humans are simply not effective at this task called "sporadic visual search." Human performance increases the longer a human spends on the tasks, and also decreases as the frequency of threats decrease—in other words, the less often they see something, the less they are expecting it. Department of Homeland Security audits in 2015 found that 95% of threats got through TSA screening officers. Human scanning operators work long shifts and currently are swapped out every 20 minutes on the scanner to avoid performance dropping off to the point where almost anything but the most obvious of threats could get through. These swap-outs are time consuming and expensive for the TSA.

Because humans are inherently poor at sporadic visual search, one of the biggest slowdowns in the security lines is caused by an operator manually pausing the belt, re-scanning bags, and otherwise taking their time while scanning for threats. On the national stage, it has been reported that this lack of efficiency leads to $4 B in economic losses and 40,000 lost jobs due to slowdowns, in addition to a loss of consumer confidence in our national security. To make matters worse, the volume of passengers nationwide is projected to double over the next two decades.

Current software solutions are focused on explosives detection in checked baggage using techniques nearly a decade old. Both the original equipment manufacturers and government forces are eager for advanced detection to aid in the discovery of sharps, firearms, explosives, and other prohibited items in carry-on baggage, in addition to safely classifying innocuous items to quickly clear bags through.

One of ordinary skill in the art will appreciate these as well as numerous other aspects in reading the following disclosure.

BRIEF DESCRIPTION OF THE DRAWINGS

Please note that this patent or application file contains at least one drawing executed in color. Copies of this patent or patent application publication with color drawing(s) will be provided by the Office upon request and payment of the necessary fee.

Features, aspects, and advantages of the presently disclosed technology may be better understood with respect to the following description, appended claims, and accompanying drawings where:

Figure 1:
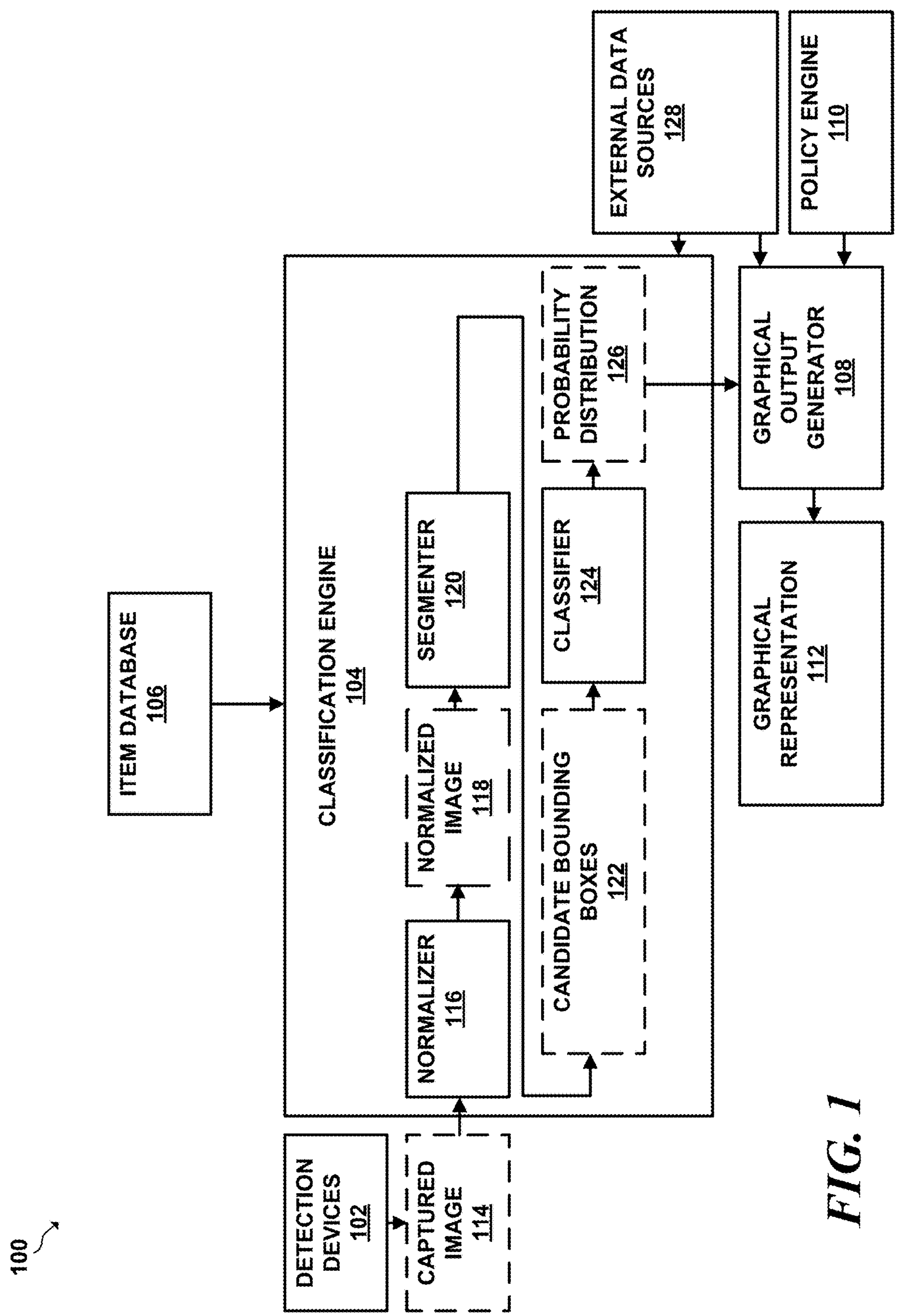
FIG. 1 is a conceptual diagram illustrating an example computer system for scanning objects.

The drawings are for illustrating example embodiments, and the inventions are not limited to the arrangements and instrumentality shown in the drawings.

DETAILED DESCRIPTION

I. Overview

Various systems, devices, and methods disclosed herein significantly improve the classification of items within a scanned object or scene. For example, according to an embodiment, a device might determine one or more of the following about an item within the scanned object or scene: (1) what the item is, (2) whether the item represents a threat, and (3) whether the item is safe. According to an embodiment, a human screening operator may view an output of the result.

Embodiments disclosed herein are directed towards systems, devices, and methods for improving classifying items and the identification of threats in a scanned object or a scene. By way of example, embodiments are described in regard to a screening system used at a checkpoint in an airport. A human operator uses the screening system to better identify threats. The embodiments may be employed in applications other than airports, for example locations where the identification of threats in an object is desired.

A screening system may scan objects, such as baggage, persons or other types of objects. The baggage scanning system may use one or more scanning devices, such as millimeter wave scanners, MRI scanners, X-Ray scanners, and/or any other type of scanning system now known or developed in the future, to scan objects for threats. The scanning devices may generate output, which may be in the form of graphical data, and/or an audiovisual indication, which security personnel may analyze to determine whether an object may pose a threat.

It is to be understood that an "object" as used herein is used to broadly describe any material entity. Examples of an "object," for illustration purposes might include a bag or luggage, purse or backpack, briefcase, box, container or cargo container, wallet, watch, laptop, tablet computer, mobile phone, stroller or wheelchair, a person, and/or any combination thereof. It is also understood that an "item" as used herein is used to broadly describe any material entity that can be part of, or within, an "object." As an example, a shoe, gun, or laptop may all be items located within an object, such as a piece of luggage. An item may contain or may be comprised of sub-items (a "sub-item" may be used interchangeably herein with an "item" unless specifically indicated). Examples of a sub-item for illustration purposes might include a battery of a laptop or a smartphone, a barrel of a gun, or shampoo within a shampoo container. A "scene," as used herein, is used to broadly describe a place, location, and/or position. Persons, objects, or items may be in a scene. For instance, a camera on a drone, manned aircraft, or satellite may capture footage of a scene or scenes. The word "scene" may be substituted in place of the word "object" in embodiments directed to the improvement of the classification of items (or persons or objects) within a scene.

At a high level, a screening system scans an object, such as baggage, persons or another type of objects. A screening system may also scan a scene, which may include persons, objects and various items. The scanning system may use one or more scanning devices, such as millimeter wave scanners, MM scanners, X-Ray scanners, and/or any other type of scanning system now known or developed in the future, to scan the object. The scanning device generates an output, which may be in the form of graphical data, and/or an audiovisual indication. In some examples, the generated data may comprise a two-dimensional (2D) or three-dimensional (3D) data representation of the given object. Other examples of detection devices are also possible. A computer system, as described herein, may receive image data of the object.

At a high level, this disclosure describes systems, methods, and techniques for improving the identification of items within an object, e.g. items in objects such as pieces of baggage or a scene. According to an aspect of this disclosure, a computer system receives a captured image from one or more detection devices. The screening system may attempt to identify regions of the captured image as containing various classes of items, thereby identifying those items. Based on the classification process, the screening system may generate a graphical representation for output that indicates information regarding some or all of the classes of items that were identified during the classification process.

In some embodiments, the screening system may generate and use various numerical techniques to determine whether a given region may contain a given class of item. If the screening system identifies a given region as containing a given class of item, the screening system may output data, e.g. for display, that indicates information about the identified given class of item. A human screening operator may then analyze the output to determine, for example, whether the identified class of item may pose a threat.

A class as described herein may refer to a given item, class of items, or a specific type of item. As examples, a class of item may refer to a class of items of a taxonomy, such as "electronics." As another example, a class may refer to a class of laptops generally, or a specific make or model of laptop, such as a "2015 Macbook Pro." A class may be described in various other manners as well.

To attempt to identify items represented within a given captured image, the classification engine first receives a captured image from one or more of the detection devices. The classification engine may then normalize the given captured image to produce a normalize image. Once the classification engine has generated a normalized image, the classification engine may utilize a segmenter which may be separate from or part of the classification engine to identify candidate bounding boxes comprising regions of pixels within the candidate image which may contain items for classification.

In some embodiments, the segmenter may analyze the features of a captured image using a neural network. In an implementation, the neural network may comprise a Region Proposal Network (RPN). The segmenter may generate score values that indicate a likelihood that a given region of the captured image contains and/or does not contain a given object. The segmenter may also define candidate bounding boxes that the segmenter determines may be likely to contain items. The segmenter may define a given candidate bounding box by generating position coordinates and dimension values for each bounding box.

In an example implementation, the RPN may comprise a set of layers. Shallower layers of the RPN may identify lower-level (e.g. simpler) features from a captured image, and deeper layers may identify higher-and-higher level (e.g. more complex) features from the captured image. Each layer may determine features from the output of the previous layer, and may transform the input representation to a different representation that encapsulates the higher-level detailed features. More particularly, the RPN may comprise a set of layers that alternate between "convolutional layers" and "pooling layers." A given convolutional layer of the RPN may receive a set of input pixels for processing, may apply a set of matrices referred to as "kernels" to the set of input pixels to generate a representation of the features identified form that set of pixels, referred to as a feature map. Each convolutional layer of the RPN may have a different associated set of kernels.

To apply a given kernel, in an example, the classification neural network may perform a process referred to as convolution, which takes a set of neighboring input values, which may comprise neighboring pixels or neighboring values of a feature map. The classification neural network expresses a given value from the set as a weighted sum of the value and its neighboring values in which the weights for each pixel are defined by the elements of the kernel matrices. The output of a convolutional layer is referred to as a "feature map" because the output contains information about features detected by the convolutional layer.

A pooling layer may selectively downsample values, e.g. pixels or values of a feature map, generated by a previous convolutional layer. More particularly, the pooling layer may determine a set of regions and may apply a pooling function, each of the regions. In an implementation, the pooling layer may apply a max-pool function to each region. The max-pool function may identify a maximum value from a given region, retain the maximum value, and may discard all other values in the region.

The RPN may first apply the convolution and pooling layers to a captured image to generate a "convolutional feature map." The convolutional feature map is effectively a downsampled multi-dimensional representation of features that the convolutional and pooling layers have identified by way of the convolutional and pooling processes performed at each layer.

After generating the convolution feature map, the segmenter may pass a set of anchor boxes having different sizes and aspect ratios, pixel-by-pixel, over each possible position of the convolutional feature map generated by the pooling and convolutional layers. The RPN applies a weight matrix to each combination of convolutional feature map position and anchor box to generate a vector for each feature map position-anchor box combination. The RPN uses classification layer and a regression layer to analyze each vector generated by the weight matrix. The classification layer generates values, referred to as probability scores, which indicate the probability that an object may or may not be present within the given region defined by the feature map position-anchor box combination.

The regression layer generates attempts to compute a position of a bounding box that closely bounds or contains any potential items that the RPN identified based on the feature map at the given anchor window-position combination. The regression layer outputs scores that indicate the position, width and height of a given bounding box.

To determine whether an item may be present within the region contained in a given anchor box and at a given position, the region proposal network may pass the vector for the anchor box-position combination generated by weight matrix through a classification layer, which may generate a score, referred to a position score value, for the given region. The position score value may indicate a likelihood that the region contains an item that may be classified. The score value, which may be referred to herein as a "position score value," associated with a given anchor box at a given position. As an example, a position score value may be between 0 and 1, inclusive.

Once the segmenter has generated scores for each position and anchor box, the classification engine may identify a set of candidate bounding boxes which have the highest position scores values. The segmenter may output the identified set of highest scoring candidate bounding boxes to a classifier, which may comprise a convolutional network, for further analysis to determine whether a given identified candidate bounding boxes may contain classifiable items.

The classifier attempts to classify a class of item to which the contents of the given candidate bounding box may belong. To attempt to categorize the contents of the given candidate bounding box, the classifier may identify features present within the pixels of the candidate bounding box, and may compare a similarity of those features to features present in a previously-determined set of classes of items which each class may represent an item or a set of items. The classification engine may express the similarity between the contents of a given candidate bounding box and a given class as a respective probability value. The set formed by combining all probability values for each of the set of classes may form a probability distribution.

More particularly, to identify a class of item contained within the pixels of a given candidate bounding box, the classification engine may receive a set of pixels of a candidate bounding box as input, and may resize, e.g. downsample the pixels of the given candidate bounding box to a standard size. After resizing the pixels of the given candidate bounding box, the classification engine may utilize a neural network of the classifier, referred to as a classification engine neural network, to identify a class of item which may categorize the standard-sized candidate bounding box.

The neural network of the classifier may comprise multiple layers. Shallower layers of the classification engine neural network may identify lower-level (e.g. simpler) features based on a given set of pixels, and deeper layers may identify higher-and-higher level (e.g. more complex) features. Each layer may determine features from the pixels of the resized candidate bounding box, and may transform the representation to a different representation that encapsulates the higher-level detailed features. More particularly, the classification engine neural network may comprise a set of layers that alternate between convolutional layers and pooling layers.

Each convolutional layer of the classification engine neural network may have a different associated set of kernel matrices, which the neural network may apply to a set of neighboring input values that are also represented as a matrix. To apply a given kernel, the classification neural network performs a convolution process on a set of neighboring input values, which may comprise a set of pixels or a set of values from a feature map. The convolution process which expresses a given value as a weighted sum of the value and its neighboring value in which the weights for each value are defined by the elements of the kernel matrices. As an example, one or more layers of the classification neural network may apply a modified Sobel kernel, which is a set of two 3×3 matrices that may be applied to sharpen the edges of a given set of values, e.g. pixels.

A pooling layer may selectively downsample regions of a feature map generated by a previous convolutional layer by determining a set of regions and applying a pooling function to each of the values in each region. One such example of a pooling function may comprise a max-pool function. The max-pool function may identify a maximum value from a given region, retain the maximum value, and may discard all other values in the region.

The classification engine neural network alternates between convolutional layers and pooling layers. Each subsequent convolutional layer applies its associated convolution to the output of the preceding pooling layer, and each pooling layer applies its associated pooling function to the output of the preceding convolutional layer. The classifier's neural network repeats this process of alternatively performing convolution and pooling until the classifier's neural network has performed the operation associated with each layer of the neural network. Based on the output of applying all the convolutional and pooling operations, the classifier neural network outputs a set of feature maps having reduced dimensionality, referred to as an embedding. An embedding may represent various features that the neural network has detected in the pixels of a given candidate bounding box.

The process of identifying candidate bounding boxes, with the segmenter, and classifying, by the classification engine, items within a given candidate bounding box is referred to as an execution phase. The execution phase performs computations using parameters that were defined before the execution phase in a training phase. Such parameters may include classes of items, kernel matrix weights, and the values of various matrices, During the training phase, the RPN and the classifier may input training data comprising images and metadata describing regions known to contain items, and known classes of items, which the RPN and classifier's neural network may analyze. By analyzing the training data images and corresponding metadata, the RPN "learns" features that distinguish the various items in the training data images. Based on the analysis of the training data that occurs during the training phase, the RPN and classification engine adjust and/or define parameters of the classification engine neural network, such as the kernel weights, weighting matrices, the classification matrix, and regression matrix. In an implementation, The RPN and classifier may adjust or define the various parameters based on a cost function. The RPN and classifier may various techniques, such as gradient descent techniques, to minimize the cost function for each of the parameters. Various other parameters may also be adjusted and/or defined during the training phase and in various other manners.

Once the classification engine has been sufficiently trained, the classification engine may detect the learned features in captured images to classify items in those images based on the learned features. It is worth noting that the data used to train the neural network may be captured using real objects and/or items, or synthetically generated.

After the classifier's neural network has generated the embedding, the classification neural network may apply a weight matrix to the embedding to map the embedding to a vector in an n-dimensional space. After the classifier applies the weight matrix, the classifier may apply a function to the n-dimensional vector resulting from the application of the weight matrix to generate a probability distribution that indicates between the pixels within a given candidate bounding box and the classes of items defined by the training data during the training phase. One such function that the classifier may apply to the n-dimensional vector may be a softmax function, which generates a probability distribution comprising a set of probability values that are all between zero and one, and which have a sum total equal to one.

The probability distribution may comprise a set of confidence values. Each given confidence value from the set indicates a similarity between the embedding generated for the given candidate bounding box and a respective class of item. Thus, the probability distribution comprises confidence values that indicate respective likelihoods that the embedding for a given candidate bounding box is correctly classified as a given class of item.

Once the classifier has determined a probability distribution for a given candidate bounding box, the classifier determines whether any of the confidence values in the distribution exceed a given threshold value, e.g. 0.95. If a probability for a given candidate bounding box exceeds the threshold value, the classification engine may classify the candidate bounding box as the class of item that meets the threshold probability, thereby identifying the candidate bounding box as the class of item.

Once a candidate bounding box has been classified as containing a given class of item, i.e. has been identified as a given class of item, the classification engine may send information about the given class of item to a policy engine. Based on an inputted class of item, the policy engine may access and output policy information related to the inputted class of item. The policy information may comprise information such as safety information (e.g. whether an item is safe or unsafe) or threat information (e.g. whether an item is a threat and how much of a threat a given item poses).

The policy engine determines policy data for a given item or class of item. The policy engine may store policy data related to items and/or classes of items in a policy database. For a given item or class stored in the item database, the policy database may store policy data related to whether the given item or class poses a security threat. As examples, the policy engine may be configured to store data indicating that a gun and a laptop may pose a threat, and a shoe may not pose a threat. The policy engine receives data related to one or more classified items from the classification engine, and determines whether each classified item poses a threat based on policy data stored for the item or for a class of items to which the classified item belongs. The policy engine may output threat information for each classified item to a graphical output generator.

After the classification engine classifies a candidate bounding box as a given class of item, and the policy engine has determined threat data related to a classified item, the classification engine may provide the classification information, to a graphical output generator. The graphical output generator may generate a graphical representation of the given classified item as well as a graphical indication which indicates information about the classified item. In general, the graphical representations generated by the graphical output generator may aid users of an inspection system to identify hazardous items. The graphical output generator may output the generated graphical representation, e.g. at a display device, such as a computer monitor, as one example. In another example, the graphical output generator may output the graphical representation via an application programming interface (API).

As indicated above, the graphical output generator may generate a graphical representation related to one or more objects identified by the classification engine. In one implementation, the graphical output generator may combine the generated visual information with image data captured from a detection device to generate a composite image that contains data from a captured image and data generated by the graphical output generator related to one or more identified items.

In another implementation, the graphical output generator may not generate a graphical representation if various criteria are met. For instance, the graphical output generator may not generate a graphical representation if the classification engine does not identify any items that are determined to be threats and/or if a low-density bin is being scanned.

In one implementation, the graphical output generator may generate a graphical representation comprising information about at least one item that the classification engine has identified in an image. In some examples, the graphical output generator may output a textual indication corresponding to an identified item. In some examples, the textual indication may comprise a make, model, or name corresponding of the identified item. In other examples, the graphical output generator may generate a graphical representation comprising non-textual, e.g. graphical information related to the identified item.

In various implementations, the graphical output generator may receive information from the classification engine related to the confidence that the classification engine has correctly identified an item. Based on the received classification confidence information, the graphical output generator may generate a graphical representation of the classification confidence level for a given identified item. In one implementation, the visual representation of the confidence level may comprise a textual indication of the confidence, such as a percentage value or a level such as "high," "medium," or "low." In another implementation, the confidence value may be represented using coloration or other non-textual indication, such as a color overlay, wherein the color determined for the overlay reflects the determined classification confidence level.

In another implementation, the graphical output generator may receive geometry information corresponding to the locations of one or more identified items from the classification engine. The geometry data may comprise sets of coordinates that form a boundary around an identified item and that identify a location of an identified item. The location information may take other forms as well. The graphical output generator may receive geometry data for each identified item. The graphical output generator may generate a bounding polygon that includes features that are based on the boundary information. As one example, the graphical output generator may generate a bounding polygon for an identified item based on the geometry data for that identified item. The bounding polygon may comprise a solid or dashed line, as some examples. In some examples, the graphical output generator may generate an outline that follows the contours of an identified item. In other examples, the bounding polygon may be a rectangular bounding box.

In some implementations, the graphical output generator may generate a graphical representation comprising a bounding polygon around an identified item that draws attention to the one or more identified items. The graphical representation may follow the contours of the identified item, or may be a simple bounding rectangle or bounding box.

In yet other implementations, the graphical output generator may generate a graphical representation comprising that emphasizes and de-emphasizes certain regions of a captured image of an object. As one example, the graphical representation may comprise a heatmap that emphasizes certain areas of an image and de-emphasizes other areas. The heatmap may emphasize regions corresponding to one or more identified items. The graphical output generator may generate a heatmap that emphasizes or de-emphasizes regions associated with identified items based on a determined level of threat posed by the respective identified item. As an example, having a first region of emphasis that corresponds to a first identified item having a high level of threat, and may generate a second region that corresponds to a second item having a low level of threat.

In yet another implementation, the graphical output generator may generate a graphical representation that obscures or masks some identified items in a captured image and in order to emphasize other identified items. As a more particular example of this implementation, the graphical output generator may determine that a first identified item has a high threat level and that other identified items have relatively low threat levels. Based on the received threat data, the graphical output generator may generate a visual overlay that masks regions associated with the items having the relatively low threat levels. In some examples, the graphical output generator may generate a graphical representation of a captured image that has transparent regions corresponding to some of the identified items. The graphical output generator may generate transparent regions that cause certain of the identified items having a lower associated threat level less to appear visible than items having a higher associated threat level.

As described above, the classification engine may be capable of identifying various items. Additionally, the classification engine may be capable of identifying sub-items such as components that may combine to form an item or items contained within another item. As one example, a classification engine may identify an item comprising a watch, and may identify a sub-item comprising a battery within the watch. As another example, a gun, bomb, or knife may be made up of smaller sub-items e.g. the barrel of a gun or the handle of a knife, that when combined, form a fully functional item. The classification engine may identify multiple sub-items from a single captured image or multiple captured images. The graphical output generator may receive information from the classification engine responsive to the classification engine determining that one or more sub-items are present in one or more images. Responsive to receiving the information that multiple sub-items are present, the graphical output generator may generate a graphical representation that indicates information about some or all of the identified sub-items.

In one example, the graphical output generator may generate a graphical representation of the item to which the sub-item belongs. For instance, if the graphical output generator receives information indicating that a barrel of a gun has been identified, the graphical output generator may generate a graphical representation of the fully assembled gun that includes the barrel. The graphical output generator may generate a graphical representation of the detected sub-item that differs relative to the representation of the fully assembled item. As an example, the identified sub-item may be represented using a first color while the assembled item may be represented using a different color, as one example. Other examples are possible as well.

In another implementation, the graphical output generator may generate a graphical representation based on an indication of user input. As an example, the graphical output generator may generate a graphical representation that illustrates a particular area or region of a previously-generated graphical representation in additional detail. The graphical output generator may generate panned or zoomed-in versions of a previously-generated graphical representation in response to an indication of a user input, as one example. The graphical output generator may generate a representation containing additional annotations and/or previously non-visible items as another example.

In another implementation, the graphical output generator may generate a graphical representation based on filtering criteria. The graphical output generator may, for instance, generate a graphical representation that includes certain items or sub-items that meet a given set of criteria, that are identified in a given sequence, or that have various characteristics.

While some of the above implementations and examples are made with reference to a single item, it should be understood that a graphical output generator may perform the techniques described herein to generate graphical representations corresponding to multiple identified items and/or sub-items (sub-items may also be referred to herein as items). The graphical output generator may generate graphical representations in other manners than the ones discussed above. It should be understood that any of the above implementations and/or examples may be combined to generate additional types of graphical representations.

According to one aspect of this disclosure, a system may comprise at least one processor, a memory, and a non-transitory computer-readable storage medium storing instructions that are executable. The instructions may be executable to cause the at least one processor to: receive a digital image that represents an object scanned by a security scanning device, receive information indicating an item identified within the image of the object, receive item data for the identified item, and generate, for output at a display, a graphical representation corresponding to the identified item based on the received item data. The graphical representation may indicate a location of the identified item, and the generated graphical representation comprises at least a portion of the digital image corresponding to the identified item.

Another aspect of this disclosure may be implemented as a method. The method may comprise: receiving a digital image that represents an object scanned by a security scanning device, receiving information indicating an item identified within the image of the object, receiving item data related to the identified item, and generating, for output at a display, a graphical representation corresponding to the identified item based on the received item data. The graphical representation may indicate a location of the identified item, and the generated graphical representation may comprise at least a portion of the digital image corresponding to the identified item.

According to another example of this disclosure, a non-transitory computer-readable storage medium may store instructions that are executable to cause at least one processor to: receive a digital image that represents an object scanned by a security scanning device, receive information indicating an item identified within the image of the object, receive item data related to the identified item, and generate, for output at a display, a graphical representation corresponding to the identified item based on the received item data. The graphical representation may indicate a location of the identified item, and the generated graphical representation may comprise at least a portion of the digital image corresponding to the identified item.

According to one aspect of this disclosure, a system may comprise at least one processor, a memory, and a non-transitory computer-readable storage medium storing instructions that are executable. The instructions may be executable to cause the at least one processor to: receive a digital image that represents an object scanned by a security scanning device, receive information indicating an item identified within the image of the object, and generate, for output at a display, a graphical representation corresponding to the identified item. The graphical representation may indicate a location of the identified item, and the generated graphical representation comprises at least a portion of the digital image corresponding to the identified item.

Another aspect of this disclosure may be implemented as a method. The method may comprise: receiving a digital image that represents an object scanned by a security scanning device, receiving information indicating an item identified within the image of the object, and generating, for output at a display, a graphical representation corresponding to the identified item. The graphical representation may indicate a location of the identified item, and the generated graphical representation may comprise at least a portion of the digital image corresponding to the identified item.

According to another example of this disclosure, a non-transitory computer-readable storage medium may store instructions that are executable to cause at least one processor to: receive a digital image that represents an object scanned by a security scanning device, receive information indicating an item identified within the image of the object, and generate, for output at a display, a graphical representation corresponding to the identified item. The graphical representation may indicate a location of the identified item, and the generated graphical representation may comprise at least a portion of the digital image corresponding to the identified item.

According to an implementation, a graphical output module may receive a digitized data representation of collection of items in a space, wherein the collection comprises at least an item. In some examples, each such collection may be a piece of baggage, purse, bag, box, or other closable container. In some examples, a collection may comprise items in a receptacle. In various examples, the digitized representation may take form as a 2-dimensional image, 3-dimensional image, or other multi-dimensional representation of objects.

The graphical output module may receive bounding data for the at least one item, wherein the bounding data comprises information that identifies a geometry associated with the at least one of the item. In some examples, the bounding data that identifies multiple possible geometries associated with an item of the at least one item.

In some examples, the graphical output module may receive one or more possible determinations of the class of one of the at least one item, or a potential determination of the exact item. In some examples, graphical output generator may receive policy data for an item comprising an indication of the dangerousness of the item, whether the item is prohibited, and under what circumstances the item may be prohibited.

The graphical output generator may generate an overlay indicator based on the geometry associated with the item and the item data, and may output the data representation of the baggage along with the overlay indicator. According to various examples, the overlay may be colored based on an indication of whether an item is unsafe or safe, color based on a degree of safety or unsafety, and/or colored based on whether the item is prohibited. In some examples, the overlay indicator may be persistently displayed along with the item, and/or flashed along with the item. In some examples, the overlay may comprise a polygon that is based on the geometry associated with the item, a basic geometric shape based on the geometry associated with the item, and/or a heatmap with a gradient based on a degree of safety or unsafety of an item. In still yet other examples, the overlay may comprise a graphical or textual annotation or a combination thereof. The overlay may comprise a solid or dotted line in some examples.

In additional examples, the overlay may comprise transparency based on an indication of whether the item is unsafe and/or an overlay that obscures every area in the image except for the item. In some instances, the overlay may obscure every area in the image except for prohibited items, or unsafe items. In some other instances, the overlay may obscure every item in the image except for prohibited items or unsafe items.

According to another aspect of the invention, a graphical output generator may receive a data representation of a piece of baggage, wherein the baggage comprises a first item and a second item, and receive bounding data for the first item of the plurality of items. The bounding data may comprise information that identifies a geometry associated with the item. The graphical output generator may receive threat data for the first item of the plurality of items. The threat data may provide an indication that the first item is unsafe, and output the first item and the second item of the data representation of the baggage, where the second item is deemphasized compared to the first item.

According to another aspect of this disclosure, a graphical output generator may receive a data representation of a receptacle, wherein the receptacle contains multiple items. The graphical output generator may further receive bounding data estimates for each item, and output only items that belong to a specified class or type of item of interest.

According to still yet another aspect of this invention, a graphical output generator may receive a data representation of a baggage, wherein the baggage comprises a plurality of items. The graphical output generator may receive bounding data for the first item of the plurality of items, and the bounding data may comprise information that identifies a geometry associated with the item. The graphical output generator may receive threat data for the first item of the plurality of items, and the threat data may provide an indication that the first item is unsafe, and may output the first item, and not output the second item, of the data representation of the baggage.

According to yet another aspect of this disclosure, a graphical output generator may receive a data representation of a receptacle, wherein the receptacle contains multiple items. The graphical output generator may also receive bounding data estimates for each item, and may output a graphical representation of items that belong only to a specified class or an item type of interest.

According to one aspect of this disclosure, a system may comprise at least one processor, a memory, and a non-transitory computer-readable storage medium storing instructions that are executable. The instructions may be executable to cause the at least one processor to: receive a digital image that represents an object scanned by a security scanning device, receive information indicating an item identified within the image of the object, and generate, for output at a display, a graphical representation corresponding to the identified item. The graphical representation may indicate a location of the identified item, and the generated graphical representation comprises at least a portion of the digital image corresponding to the identified item.

Another aspect of this disclosure may be implemented as a method. The method may comprise: receiving a digital image that represents an object scanned by a security scanning device, receiving information indicating an item identified within the image of the object, and generating, for output at a display, a graphical representation corresponding to the identified item. The graphical representation may indicate a location of the identified item, and the generated graphical representation may comprise at least a portion of the digital image corresponding to the identified item.

According to another example of this disclosure, a non-transitory computer-readable storage medium may store instructions that are executable to cause at least one processor to: receive a digital image that represents an object scanned by a security scanning device, receive information indicating an item identified within the image of the object, and generate, for output at a display, a graphical representation corresponding to the identified item. The graphical representation may indicate a location of the identified item, and the generated graphical representation may comprise at least a portion of the digital image corresponding to the identified item.

Other implementations and examples are possible as well and will be further understood by one of ordinary skill in the art upon reading the following description.

II. System Overview

FIG. 1 is a conceptual diagram illustrating an example computer system for scanning objects. FIG. 1 illustrates a computer system 100. Computer system 100 may be implemented at locations where security personnel may scan objects to determine whether items contained in those objects that may pose a security threat. For instance, computer system 100 may comprise, or be loaded onto as executable software code, a checkpoint screening system, such as for example, a Rapiscan checkpoint screening system (current Rapiscan examples include Rapiscan 618XR HP, 620XR HP, 622XR HP, 618XR, 620XR, 620DV, or 622XR). In other examples, computer system 100 may be implemented at locations remote from the scanned object or scene. For instance, computer system 100, and/or portions thereof, may be located in a remote office, in the cloud, on a moving vehicle or aircraft, and so on.

FIG. 1 comprises various items such as, modules, engines, components, and the like that may comprise hardware, software, firmware, or combinations thereof that may perform various functions. Such items are illustrated with solid borders. Other items are illustrated with a dashed border. Such items may represent inputs and/or outputs rather than functions.

In the example of FIG. 1, computer system 100 comprises one or more detection devices 102, a classification engine 104, an item database 106, a policy engine 110, external data sources 112, and a graphical output generator 108, which may generate a graphical representation 112. Detection devices 102, classification engine 104, item database 106, policy engine 110, graphical output generator 108, and/or external data sources 128 may be integrated, or may be separate devices. Classification engine 104, item database 106, policy engine 110, and graphical output generator 108 may comprise hardware, software, firmware or any combination thereof.

While some examples described herein may refer to functions performed by given actors such as "users" and/or other entities, it should be understood that this description is for purpose of explanation only. The claims should not be interpreted to require action by any such example actor unless explicitly required by the language of the claims themselves.

In the Figures, identical reference numbers identify identical or at least generally similar elements. To facilitate the discussion of any particular element, the most significant digit or digits of any reference number refers to the Figure in which that element is first introduced. For example, element 108 is first introduced and discussed with reference to FIG. 1.

Detection devices 102 may capture images of objects, such as baggage, clothing, people, and the like. Detection devices 102 may also capture images a scene, which may broadly be used to describe a place, location, and/or position Detection devices 102 may output the captured images to a classification engine 104. Classification engine 104 performs a process referred to as classification to identify regions of a captured image that may contain an item, and to determine a class of item contained within the region, thereby identifying items within a captured image.

Classification engine 104 may classify items, sub-items, and/or classes of items from the captured images based on item information obtained from item database 106. If classification engine 104 identifies one or more items in a captured image, classification engine 104 may output information related to the identified items to graphical output generator 108. Based on the information related to the identified items received from graphical output generator 108, graphical output generator 108 may generate a graphical representation 112 for the identified items. Graphical representation 112 may comprise various information related to one more identified items. Graphical output generator 108 may output the generated graphical representation 112 via an API or at a display device. Security operators may view generated graphical representation 112. Graphical representation 112 may aid the users in detecting, for example, potentially threatening items, safe items, or both threatening and safe items. Further, data collected from output generator 108, such as which objects, items, and sub-items have been classified may be collected and stored in memory. Access to that data may prove valuable in accordance with other purposes than security.

Detection devices 102 may comprise one or more detection devices that capture images of objects such as baggage items, clothing, human beings, and the like. Example detection devices may comprise x-ray scanners, MM scanners, CT scanners, spectral band scanners, millimeter wave scanners, or any other scanning device now or later devised. Other manners of detection devices are also possible. The images captured by detection devices 102 may represent the captured data using various representations. As examples, the captured images may be represented using pixels, voxels, polygons, or elements that may generally be used to construct image data.

In some examples, the images captured by detection devices 102 may be captured in a DICOS ("Digital Imaging and Communication for Security" standard published by the National Electrical Manufacturers Association) format. The captured images may contain metadata, which may comprise information related to material density, geometric dimensions, and/or atomic numbers of various regions or graphical elements in a captured image, as some non-limiting examples. It should be understood that image data may be captured in other formats and the metadata may take other various forms as well.

Detection devices 102 may capture one or more images for each object being scanned. As examples, detection devices 102 may capture a single image of an object, or multiple different images of an object. The multiple images may be of a same perspective or from multiple different perspectives. In some examples, the captured images may comprise three-dimensional "slices" of an object, wherein each slice represents the scanned object at a different level of scan depth.

Captured image 114 may comprise representations of one or more items and/or sub-items represented in each image captured by one or more of detection devices 112. As an example, one of detection devices 102 may capture an image of an object comprising a piece of luggage. In this example, the piece of luggage may contain a variety of different items, such as a shoe and a gun. The shoe and gun may each be items represented in the captured image. In the example of FIG. 1, detection devices 102 may capture a captured image 114. It is worth noting that the shoe and gun items are not yet classified as a "shoe" or "gun," but rather only show up, as a whole or in part, in the captured image (i.e., at this point in time, only the person who packed the luggage might know that there is a shoe and gun).

Detection devices 102 may communicate to each other to share captured image data or other data with each other. Detection devices 102 may, for example, be connected via a network such as a wireless network (e.g., the IEEE 802.11x family of "Wi-Fi" networks), Ethernet, cellular networks, Bluetooth, NFC, or the like. In some examples, detection devices 102 may be connected with point-to-point data links. In various examples, detection devices 102 may be communicatively coupled to a computing device, and the computing device may relay information, as necessary, between detection devices 102. Detection devices 102 may output some or all of the captured images to classification engine 104.

Item database 106 stores item data related to various items and/or classes of items that may be identified by classification engine 104. In some implementations, the item data stored in item database 106 may comprise information related to items and/or classes of items. The dictionary of items and/or classes may have been previously-generated during a training phase and based on training images and metadata of known items.

Item database 106 may comprise data, such as hierarchical classification data, item data, geometry data, image data, identification data, metadata, and other data related to items and/or classes of items that may be identified by classification engine 104. For a given item, item database 106 may store the data for a given item or class of item in one or more database entries. Each entry may be indexed based on an identifier that corresponds to a given class of item.

A stored entry of item database 106 for a given class of item may comprise item data such as classification data, geometry data, scanned image data, identification data, metadata, and the like for that class of item. Geometry data may comprise data related to a given item or class's shape, size, geometry, color characteristics, density, atomic number, dimensions (e.g. width, height, depth) and the like. Geometry data may take other forms as well. Identification data may comprise information to a make, model, name, or other human- and/or computer-interpretable identifiers for a given item or class of item. Identification data may take various other forms as well. Classification data may comprise data that indicates one or more taxonomical classes, which may in turn comprise a hierarchical taxonomy, to which a given item may belong. Image data may comprise one or more images of representative scans of a given item or class of item. Metadata may comprise additional information related to the identification or classification of a given item, e.g. data that does not fit into one of the above categories of item data. The data stored in item database 106 may take various other forms as well.

As an example, item database 106 may contain one or more database entries for a Macbook Pro laptop. In an entry, there may be metadata in the form of a key that identifies a given entry in item database 106 as corresponding to the Macbook Pro. The key may be further associated with one or more database entries that contain a textual identifier for a given item, e.g. "2015 Retina Macbook Pro," may comprise such a textual identifier. The one or more entries may also comprise one or more scanned images for the Macbook Pro, and one or more classes of a taxonomy to which the Macbook pro belongs, e.g. "laptop", "electronic," "Apple," and/or "Macbook" classes. In some examples, the one or more database entries may comprise geometry data for the Macbook Pro, which may identify the dimension of the Macbook Pro, e.g. 12"×18," and/or CAD drawings. The one or more entries may be associated with additional data as well.

In another example, item database 106 may contain one or more entries of hierarchical classification data. The one or more entries may be related to a given class of item. The classification data may comprise scanned images of items that belong to the given class of item, and associations with entries in item database 106 that are related to the given class. The classification data may also comprise information about where a given class fits into a given classification taxonomy. As an example, item database 106 may contain an entry for a "gun" class. Item database 106 may include scanned images of guns that belong in the gun class with the gun class entry. The gun class entry may also indicate that a gun is a class of weapon, as an example.

The metadata of item database 106 may take various forms. As an example, the metadata may indicate which one or more items or classes for which a given item or class of item may be commonly mistaken. To give a more particular example, item database 106 may store metadata that indicates a hairdryer is commonly mistaken for a gun by screening personnel. If a hairdryer is identified by classification engine 104, the metadata from item database 106 related to the frequently mistaken item identity may be provided to graphical output generator 108, which may in turn generate a graphical representation, e.g. warning security operators that a commonly mistaken item has been identified, and/or the items for which the identified item is commonly mistaken. The data stored in item database 106 may take various other forms as well.

Classification engine 104 may comprise hardware or software that attempts to classify regions of a captured image, such as captured image 114 as containing classes of items, items and/or sub-items. Classification engine 104 may attempt to classify regions of a captured image, thereby identifying items in those regions using various techniques that will be described in greater detail herein. Responsive to classifying a region as containing a class of item or an item, classification engine 104 may output information related to one or more classified items to graphical output generator 108.

To attempt to classify item(s) from a captured image, may first normalize a captured image. In the example of FIG. 1, normalizer 116 of classification engine 104 may perform normalization on captured image 114. Normalization may generally involve adjusting the pixel values of a captured image to conform to various statistical properties, such as desired average values and a desired standard deviation. Normalizer 116 produces a normalized image 118 as an output.

Once normalizer 116 has generated a normalized image 118, normalizer 116 may output the normalized image to segmenter 120. Segmenter 120 may comprise a neural network such as an RPN that may be implemented in hardware software, firmware or any combination thereof. The RPN of segmenter 120 may comprise a set of layers. Shallower layers of the RPN may identify lower-level (e.g. simpler) features from a captured image, and deeper layers may identify higher-and-higher level (e.g. more complex) features from the captured image. Each layer may operate on output of the previous layer, and may transform the input representation to a different representation that encapsulates higher-level features than the previous layer.

More particularly, the RPN of segmenter 120 may comprise a set of "convolutional layers" and "pooling layers." A given convolutional layer of the RPN may receive a set of input values, such as pixels, for processing, may apply a set of matrices referred to as "kernels" to the set of input values to generate a set of values referred to as a feature map. Each convolutional layer of the RPN may have a different associated set of kernels.

To apply a given kernel, the classification neural network performs a process referred to as convolution, which takes a set of neighboring values (e.g. pixels or values from a feature map) as input, and expresses a given value from the set as a weighted sum of the given value and its neighboring values in which the weights for each pixel are defined by the elements of the kernel matrices. The set of output values generated by a convolutional layer is referred to as a "feature map" because the output contains information about features detected by the convolutional layer.

A pooling layer may selectively downsample regions of a feature map generated by a previous convolutional layer. More particularly, the pooling layer may determine a set of regions, each of which comprises a set of values, and may apply a pooling function that downsamples values of each of the regions. In an implementation, the pooling layer may apply a max-pool function to each value of region. The max-pool function may identify a maximum value from a given region, retain the maximum value, and may discard all other values in the given region, thereby effectively performing selective downsampling of the values of the given region.

The RPN of segmenter 120 first applies the convolution and pooling layers to a captured image to generate a convolution feature map. The convolutional feature map is effectively a downsampled multi-dimensional representation of features that the convolutional and pooling layers have identified by way of the convolutional and pooling processes performed at each layer. It is important to note that the feature map does not alter the spatial layout of a given captured image. Therefore, any point in the feature map can be projected back to a corresponding location in the captured image.

In an implementation, a captured image may have dimensions a by b by 3 where 3 is the number of color channels in the captured image. It should be noted that other image dimensions are possible as well. The convolutional and pooling layers may output convolution feature map having size: x by y by c, where x, and y are much smaller than a and b, and c is equal to 512. Various other feature map dimensions are possible as well.

After generating the convolution feature map, segmenter 120 generates a set of anchor boxes having different sizes and aspect ratios. The anchor boxes may have aspect ratios of 1:2, 2:1, and 1:1, as some examples. Segmenter 120 passes each anchor box, pixel-by-pixel, over each possible position of the convolution feature map of the normalized image. For a given anchor box, the RPN applies a weight matrix to a given combination of feature map position and the given anchor box to generate a vector for the given feature map position-anchor box combination.

The RPN then uses classification layer and a regression layer to analyze each vector generated by the weight matrix. The classification layer generates values, referred to as probability scores, which indicate the probability that an object may or may not be present within the given region defined by the feature map position-anchor box combination. The regression layer generates attempts to compute a position of a bounding box that closely bounds or contains any identified objects of the feature map at the given anchor window position. The regression layer outputs scores that indicate the position, width and height of a given bounding box.

Segmenter 120 may determine various parameters of the RPN during a training phase. Examples of such parameters may include such parameters as kernel matrix weights, weighting matrix values, classification, and regression matrix values. Segmenter 120 may define various other parameters during the training phase as well.

To determine whether an item may be present within the pixels contained in a given anchor box and at a given position, the region proposal network may generate a score for each region defined by a given anchor box at a given position of the normalized image, referred to a position score value. The position score may indicate a likelihood that the region contains an item that may be classified. As an example, a position score value may be between 0 and 1, inclusive.

Once segmenter 120 has generated scores for each position and anchor box combination, the classification engine may identify a set of candidate bounding boxes 122, which have the highest position scores values. Segmenter 120 may identify the highest-scoring candidate bounding boxes having associated position score values that exceed a given threshold, for example 0.95. Various other threshold values are possible well. After identifying candidate bounding boxes 122, segmenter 120 may output the identified set of highest scoring candidate bounding boxes to classifier 124 for further analysis to determine whether a given identified candidate bounding box may contain a known class of item.

Classifier 124 may comprise a convolutional neural network, which may be implemented in hardware, software, or any combination thereof. In some examples, classifier 124 may comprise a Residual Neural Network. The neural network of classifier 124 may comprise multiple interconnected layers. A set of pixels defined by a candidate bounding box may flow through each layer of the neural network. Shallower layers (i.e. layers that the pixels or representations thereof flow through first) of the neural network may identify lower-level features from a given set of pixels, and deeper layers (i.e. layers that the pixels or representations thereof flow through later in the classification engine neural network) may identify higher-and-higher level features from the candidate bounding box. Each layer may determine features from the pixels of the candidate bounding box, and may transform the representation to a different representation that encapsulates the higher-level detailed features.

The layers of the neural network of classifier 124 have been previously configured to detect features of various items during execution of a training phase. During the training phase, the neural network "learns" the features of these items based on training images of the items fed into the classifier's neural network. More particularly, during the training phase, the neural network of classifier 124 takes numerous training images of known items as input and configures the neural network to be capable of detecting features determined from the training images.

In some embodiments, synthetic data training data may be created by projecting models of items onto previously-captured data, overlaying images of items onto previously-captured data, or fully simulating an entire set of items and its background. In yet other embodiments, such synthetic training data may be created through generative machine learning algorithms that can generate data based on data they have been trained on in the past. As an example, an algorithm trained on large electronics may become capable of generating synthetic images of novel electronics that may appear realistic to the human eye. It is worth noting that classification engine 104 may be trained on different sources of data at various times.

Once the neural network has been trained, classifier 124 may analyze the similarity between a set of pixels defined by a given candidate bounding box and the representations identify an item that matches the pixels defined by the given candidate bounding box. The similarity analysis performed by classifier 124 may yield a probability distribution 126 that expresses the similarity between the contents of the given candidate bounding box and classes of items that the classifier's neural network was trained to recognize.

More particularly, classifier 124 may determine a similarity between the pixel contents of a given one of candidate bounding boxes 122, and classes of known items that classifier 124 was trained to recognize during the training phase. Based on the embedding that classification engine 104 generates for the given candidate bounding box, the neural network of classification engine 104 may generate probability distribution 126. Probability distribution 126 may comprise a set of confidence values. Each confidence value from the set indicates a similarity between the contents (e.g. pixel contents) of a given candidate bounding box and a respective class of item. Thus, a given confidence value of probability distribution 126 indicates a respective likelihood that the contents of the given candidate bounding box may be correctly classified as that respective class of item.

Once classification engine 104 has determined probability distribution 126 for a given candidate bounding box, classification engine 104 determines whether any of the confidence values in the distribution exceed a given threshold value. In some examples, the threshold value may be 95%, i.e. 0.95. If the probability for a given candidate bounding box exceeds the threshold confidence value, classification engine 104 may classify the given bounding box as containing the item that meets or exceeds the threshold confidence value, thereby identifying an item in the given candidate bounding box. In some embodiments, classification engine 104 may determine that individual pixels or regions of the data contain insufficient information to make classification determinations with a sufficiently high confidence level.

Classifier 124 may repeat the process of attempting to classify items within each of candidate bounding boxes 122 until each of the candidate bounding boxes have undergone the classification process. Classifier 124 may also generate additional data related to the classification process. Responsive to completing classification process, and generating the additional data, classification engine 104 may output the captured image, and additional classification data to item database 106, policy engine 110, and/or graphical output generator 108, as some examples.

Such additional data related to the classification process may comprise metadata, classification information, identification information, and the like. As examples of the additional classification-related data, classification engine 104 may output a confidence level that may indicate the confidence that classification engine 104 has correctly classified a given item or class of item. Classification engine 104 may generate the confidence level, e.g. based on probability distribution 126 or in various other manners. It is worth noting that "known" is used in the context of an item that the classification engine 104 identifies with a confidence level as being classified as an individual known description of an item or class of an item. As an example, the classification engine 104 may classify a heavily modified Macbook Pro as a Macbook Pro with an associated confidence level, and may classify the heavily modified Macbook Pro as a "laptop" with a different associated confidence level. As another example, the classification engine may classify a laptop model or brand that has never been captured before because of a similarity to past laptops, where such similarity can be based on a visual comparison or more complex feature comparisons developed through the process of training a neural network or other machine learning algorithm on large electronics.

In another embodiment, the confidence level may factor in the degree to which the item is obstructed, the number of overlapping items, the resemblance of an item to other known items or taxonomies of items, the unfamiliarity of a given item, or a number of other factors that could increase, decrease, or reinforce the confidence level. The confidence level may also take into account the degree to which x-rays or other penetrating waves or fields are able to image the items, and may decrease to indicate an inability for such waves or fields to penetrate the items, which may be cause by densely-packed items or objects of a high density or atomic number, among other factors. The confidence may be unrelated to the similarity of the object to a known object, as in another embodiment the classification engine may recognize a modified version of an item.

In yet another embodiment, the system may specify different confidence levels for various classifications along an item's proposed taxonomy, and in one embodiment may specify a confidence level for the exact make and model of an electronic and another confidence level for whether it is a laptop, for example. In yet another embodiment, a confidence level may be generated by forward propagation of a pre-trained neural network. In yet another embodiment, a confidence level may be generated by pre-trained non-neural-network machine learning techniques. In yet another embodiment, the confidence level may represent the confidence of the classification of an item separately from the confidence of the segmentation of the item's geometry. In yet another embodiment, the confidence level may be manually, dynamically, or algorithmically adjusted based on the time of analysis, checkpoint location, and intelligence chatter related to items that may be in the process of being analyzed. In yet another embodiment, the confidence levels may be associated with the classification of an item, with an area being analyzed, or with individual pixels being analyzed. In yet another embodiment, the confidence level may be associated with material properties associated with a classified item, a continuous area, and/or multiple items or areas in proximity of each other.

In some implementations, classification engine 104 may attempt to classify sub-items from a captured image, e.g. captured image 114. Classification engine 104 may attempt to detect sub-items in a similar manner as described above with respect to identifying items or classes of items. In one implementation, classification engine 104 may identify a given class of item, and responsive to identifying a class of item, may analyze the candidate bounding box associated with the item for sub-items (e.g., components) contained within, or that comprise the item. In another implementation, classification engine 104 may classify a first sub-item (e.g. a component) of an item. As an example, classification engine 104 may classify a sub-item comprising a barrel of a gun. Classification engine 104 may determine, e.g. based on data from item database 106, that the barrel sub-item is associated with a gun, which comprises an item. Responsive to classifying a first component or sub-item, classification engine 104 may attempt to classify additional sub-items belonging to, or associated with the identified item, e.g. by selecting a neural network that has been specifically trained to identify sub-items associated with the given identified item. In some examples, classification engine 104 may attempt to classify the sub-items from the same captured image as the first sub-item or from additional captured images.

After classification engine 104 has classified a known item, classification engine 104 may attempt to determine a class from a taxonomy to which the classified item belongs. To determine a class for a given item, classification engine 104 may access item data comprising classification data from a database, such as item database 106 or another data store to determine the class to which the given item belongs. As an example, within the classification data, there may be a "weapon" class that comprises guns and knives. Classification engine 104 attempts to classify each identified item into a category defined by the classification data for the given item. In some examples, the classification data may also comprise information associated with each classification engine, which indicates threat data about that classification engine. Referring back to the gun and shoe example, the classification engine may determine, based on the classification data, that the gun is a threat and/or the shoe is not (e.g., the shoe is safe). Classification engine 104 may also generate item data comprising metadata related to the classification of each item. As an example, classification engine 104 may generate a classification confidence level for each classified item. The classification confidence level may indicate the confidence that classification engine 104 has correctly classified a given item.

Graphical output generator 108 obtains captured images from classification engine 104, and the additional information related to each item classified by classification engine 104. Graphical output generator 108 may generate graphical representations, e.g. graphical representation 112 related to one or more of the identified items based on the received information and the captured image. The generated graphical representation 112 may assist users of the inspection system in identifying and/or sub-items items within a given scanned object.

Graphical representation 112 may comprise images, such as 2-D or 3-D images. The images may contain parts of one or more images captured by detection devices 102. Graphical representation 112 may also comprise representations of identified items, and may emphasize certain potentially-identified items or sub-items, and regions associated with threats for closer inspection by a security operator. In one implementation, graphical representation 112 may comprise an overlay that adds annotations and other additional graphical elements to a scanned image. In some examples, the overlay may comprise a heatmap that may emphasize and/or de-emphasize regions associated with identified items. As another example, the overlay may obscure objects that do not have high associated threat levels (e.g. items that are safe). The overlay may comprise an outline that surrounds an item or sub-item having a high threat level. In still another example, the overlay may comprise a graphical and/or textual indicator. The indicator may comprise an identifier associated with an identified item, for example a name of the object, an icon corresponding to the object, or a make, model or name of the identified item. Other examples of the overlay are possible as well.

In other embodiments, graphical output generator 108 may generate a graphical representation responsive to identifying an item, which may be displayed as an overlay above or alongside the item. In yet other embodiments, graphical output generator 108 may display various representations including an image of a known item corresponding to the identified item, an image of a known item in the class corresponding to the identified item, an image of a known item in the class corresponding to the identified class with a given region. In yet other embodiments, the representation may take the form of a 3D model, rotating 3D model, or the display of multiple representations simultaneously or sequentially.

Graphical output generator 108 may generate graphical representation 112 based on received item data from sources such as classification engine 104, item database 106, policy engine 110, as some non-limiting examples. The item data may comprise metadata, such as classification, policy, or identification metadata, item identification data, item classification data, policy data, and the like.

Graphical output generator 108 may access policy information related to identified items in an image from policy engine 110. The policy information may indicate whether an identified item poses a threat, and what the threat level of the object may be. As examples, policy engine 110 may comprise, and may access a database of items that are currently considered to be threats, and another set of items that are currently considered safe and/or unsafe. The sets of safe and unsafe items may differ based on the security setting, e.g. whether relatively higher or lower security is implemented at a given site. In some embodiments, policy engine 110 may be updated periodically or on-the-fly (or in real time), depending on, for example, whether there is network connectivity to the system 100. The database within policy engine 110 may be capable of being updated manually, or automatically based on newly determined threats.

As an example, policy engine 110 may be updated to indicate laptops in general, or just a specific kind of laptop, as potentially unsafe in response to a prohibition of laptops, or in response to a prohibition of the specific kind of laptop, from being brought on commercial airline flights. As yet another example, policy engine 110 may be updated to indicate that the Galaxy Note 7 is unsafe in response to the device being recalled. As yet another example, policy engine 110 may be updated to indicate that a new 3D printed gun available online constitutes a firearm and should not be allowed on an airplane. In yet another example, the database can be quickly updated to identify and mark the 3D printed gun as prohibited. In yet another example, policy engine 110 may be updated to indicate that a certain model of hairdryer that looks like a firearm under X-Ray, CT, or multispectral scanners is indeed a safe item and should be allowed in an airplane cabin. The database would indicate to the system that the item is safe, preventing the bag from being searched and increasing the throughput at the checkpoint.

In some embodiments, graphical output generator 108 may receive information from the classification engine 104 indicating that individual pixels or regions of the image contain insufficient information to determine a classification, and graphical representation 112 may comprise such information (e.g., "Insufficient Information" or a similar indication to signal the operator). Graphical output generator 108 may access policy information from policy engine 110 to determine whether graphical representation 112 should indicate an inability to classify items as threatening, safe, or neutral. In another embodiment, graphical output generator 108 may not generate a graphical representation over such area.

According to an aspect of this invention, policy engine 110 may store policy data in a database for items and classes of items. The policy data may indicate at threat level for a given item or class, as well as data indicating whether a given item or class is prohibited (i.e. banned from passing through security). An item may be a member of a single class or multiple classes. Table 1 describes three example policy database entries for a pistol, a Galaxy Note 7 smartphone, and hairdryers.

TABLE 1

Example Policy Database Entries

| Item | Class(es) | Broadly Prohibited | High-Risk Airport Prohibited | Threat Level |
|---|---|---|---|---|
| Glock Pistol | Gun, firearm | Yes | Yes | High |
| Galaxy Note 7 | Electronic, cellphone, smartphone | Yes | Yes | Low |
| Hair Dryer | Appliance | No | No | Low |
| Modified Macbook Pro 2012 | Laptop | No | Yes | High |

In the example of FIG. 1, the policy database comprises three entries, an entry for a pistol, a Galaxy Note 7, and a hair dryer. In the above example of Table 1, each entry may have one or more classes, a value indicating whether the item is prohibited, and an associated threat level. The policy database entries may have other fields as well. In the above example, the pistol is associated with gun and firearm classes, is prohibited, and poses a high threat level. The Galaxy Note 7 is associated with electronic, cellphone, and smartphone classes, is prohibited, and poses a low threat level. The hair dryer is associated with an appliance class, is prohibited, and has a low threat level.

Graphical output generator 108 may generate graphical representation 112 based on the entries in the policy database. Graphical output generator 108 may access entries such as those in Table 1 using a database query, e.g. SQL (structured query language) or the like. Based on the information in the accessed entry of the policy database, graphical output generator 108 may generate graphical representation 112.

Graphical output generator 108 may also generate graphical representation 112 based on data analysis obtained from external data sources 128. External data sources 128 may comprise various different data sources and/or analysis engines. Examples of such external data sources may comprise data sources from intelligence agencies, passenger data sources, itinerary data sources, and data from other of devices (e.g. detection devices 102 or other security-related devices), etc. External data sources 128 may also comprise one or more trend analysis engines. External data sources 128 may take various other forms as well.

At high level, external data sources 128 may generate data and/or perform analysis, which may affect the generation of graphical representation 112 by graphical output generator 108 and/or classification performed by classification engine 104. The data generation and analysis may take various forms. For instance, external data sources 128 may generate and analyze data from various data sources in a manner such that various parameters of a security screening system may be dynamically adjusted and individualized at various levels of granularity (e.g. at a given checkpoint, detection device, airport, or national level).

In one implementation, external data sources 128 may comprise analysis of passenger travel information. Such information may comprise information such as: a passenger's identity, travel history (e.g. locations to which a passenger has previously traveled), a passenger's current itinerary, information about a passenger's baggage, etc. Passenger data may take various other forms.

As one example, a passenger analysis engine of external data sources 128 may determine whether a given passenger is a person of interest (e.g. to intelligence agencies). If the passenger is a person of interest, external data sources 128 may take various actions. For instance, external data sources 128 may output an indication to graphical output generator 108 or classification engine 104 to cause classification engine 104 to use a heightened level of scrutiny when attempting to classify items within the passenger's baggage. The heightened level of scrutiny may take the form of adjusting (e.g. lowering) the confidence threshold that a given region must meet to be classified as containing a given class of item. As another example, external data sources 128 may generate an output to cause graphical output generator 108 to generate a graphical indication specifying that the passenger is a person of interest.

As another example, external data sources 128 may obtain and analyze information related to a passenger's occupation. For instance, external data sources 128 may determine a passenger's occupation, and based on the determined occupation, may determine whether items identified within the passenger's baggage are consistent with the passenger's determined occupation. As a more specific example, external data sources 128 may determine that a given passenger is a software engineer, and may determine whether items within the given passenger's bag are consistent with being a software engineer. As another example, external data sources 128 may determine that a given passenger works as a carpenter, and based on that determination, may not flag certain items related to the carpenter's occupation as suspicious (e.g. a nail gun, saw, etc.). External data sources 128 may take various other actions based on a passenger's occupation as well.

In another implementation, external data sources 128 may perform various analysis based on a passenger's travel history. As one example, external data sources 128 may identify that a given passenger is going through a security screening, and may determine whether the given passenger is a frequent flyer (e.g. based on data provided by an airline's frequent flyer service), or whether the passenger is a frequent traveler. If external data sources 128 determine that the given traveler is a frequent flyer or business traveler, external data sources 128 may cause classification engine 104 to be less strict about flagging items in the passenger's baggage as suspicious or may output an indication to graphical output generator 108 to cause graphical output generator 108 to generate a graphical indicator that the traveler is a frequent flyer or a business traveler.

In another implementation, external data sources 128 may perform analysis based on a passenger's previous history. As one example, external data sources 128 may compare captured images of a given passenger's baggage to images of the given passenger's baggage captured at some time in the past. If the images captured in the past of the passenger's baggage differ significantly from images of the given passenger's baggage captured at the current time, external data sources 128 may output an indication to classification engine 104 or graphical output generator 108. Such an output may cause classification engine 104 to apply a heightened level of scrutiny when classifying items in the given passenger's baggage or may cause graphical output generator 108 to generate a graphical indication that the passenger's baggage has a different appearance relative to images of the traveler's baggage scanned at time(s) in the past. In such instances, the output may cause graphical output generator 108 to output images of the passenger's baggage that were captured at times in the past as part of graphical representation 112. External data sources 128 may generate various outputs based on a passenger's history such as a passenger's baggage history as well.

In another implementation, external data sources 128 may analyze a passenger's travel itinerary data. External data sources 128 may analyze a passenger's travel itinerary data in various manners. As an example, external data sources 128 may analyze a passenger's itinerary by comparing a passenger's current itinerary to a passenger's previously-traveled-to destinations. Based on the comparison, external data sources 128 may generate an output, which may be received by components of computer system 100, such as graphical output generator 108 and/or classification engine 104. In one implementation, the analysis of the passenger's itinerary may determine whether the traveler's itinerary includes travel to destinations that are considered "high-risk" or to destinations that have a high associated threat level. In another implementation, the comparison may determine whether the passenger's current itinerary contains destinations that are significantly different than the passenger's previous destinations. The analysis of the traveler's itinerary may take various other forms as well. Based on the output generated by the comparison, graphical output generator 108 may generate a graphical indicator, and classification engine 104 may alter the classification process as described above. The analysis of the passenger's travel itinerary may take various other forms as well.

In another implementation, external data sources 128 may comprise and output data from security devices that are in communication with each other. For instance, external data sources may comprise data from a metal detector that is in communication with other security devices such as detection devices 102. External data sources 128 may output data from such a detection device to various other components of computer system 100, such as classification engine 104, graphical output generator 108, etc. Outputting such data may have various effects. As one example, a metal detector may output data indicating whether a passenger passed through the metal detector without setting off the metal detector. Based on the output from the metal detector, classification engine 104 may adjust various classification parameters, e.g. confidence values, etc. As another example, external data sources 128 may comprise data from a millimeter wave scanner that a passenger may pass through. If a millimeter wave scanner detects a suspicious object on the person, external data sources 128 may output data to other components of computer system 100 to cause those other components to take various actions. Other security devices may take various other forms and may output various other data as well.

In another implementation, data sources 128 may comprise a trend analysis engine, which may analyze trends, such as statistical data, from various data sources. Such trend data may take various forms. As one example, trend data may comprise statistical trend data about the certain items are detected. Examples of such trend data may comprise frequency data, median, mode, standard deviation, variance, and other statistical measures related to items that are identified or cannot be identified. For instance, the trend data may comprise a metric that indicates the frequency with which a certain type of laptop, or laptops generally are classified by classification engine 104. Such trend data may be aggregated from multiple different security checkpoints and across multiple different locations as one example. The trend data may take various other forms as well.

The trend analysis engine may monitor the trend data and may generate alerts based on the trend data. The trend analysis may generate output in various manners. As one example, the trend analysis engine may generate an output to computer system 100 responsive to detecting an abnormally high or low frequency of a given item or combination of items. For instance, the trend analysis engine may generate an output responsive to determining that an abnormally high percentage of Macbook Pro's have been identified at a security screening checkpoint of a given airport. As another example, the trend analysis engine may generate an output responsive to determining that an abnormal percentage of unidentified items are being detected. The trend analysis engine may generate various other output as well.

Based on the output generated by the trend analysis engine, various parameters of computer system 100 may be dynamically adjusted. As example, based on output from the trend analysis engine, classification engine 104 may adjust various threshold sensitivities for classifying various items or combinations of items. Various other parameters of computer system 100 may be adjusted as well.

Each of these example implementations of computer system 100 may be embodied as a method, a device configured to carry out the implementation, a system of devices configured to carry out the implementation, or a non-transitory computer-readable medium storing instructions that are executable by one or more processors to carry out the implementation, among other examples. One of ordinary skill in the art will appreciate that this disclosure includes numerous other embodiments, including combinations of the example features described herein. Moreover, any example operation described as being performed by a given device to illustrate a technique may be performed by any number suitable devices, including the devices described herein.

II. Example Segmenter

Figure 2:
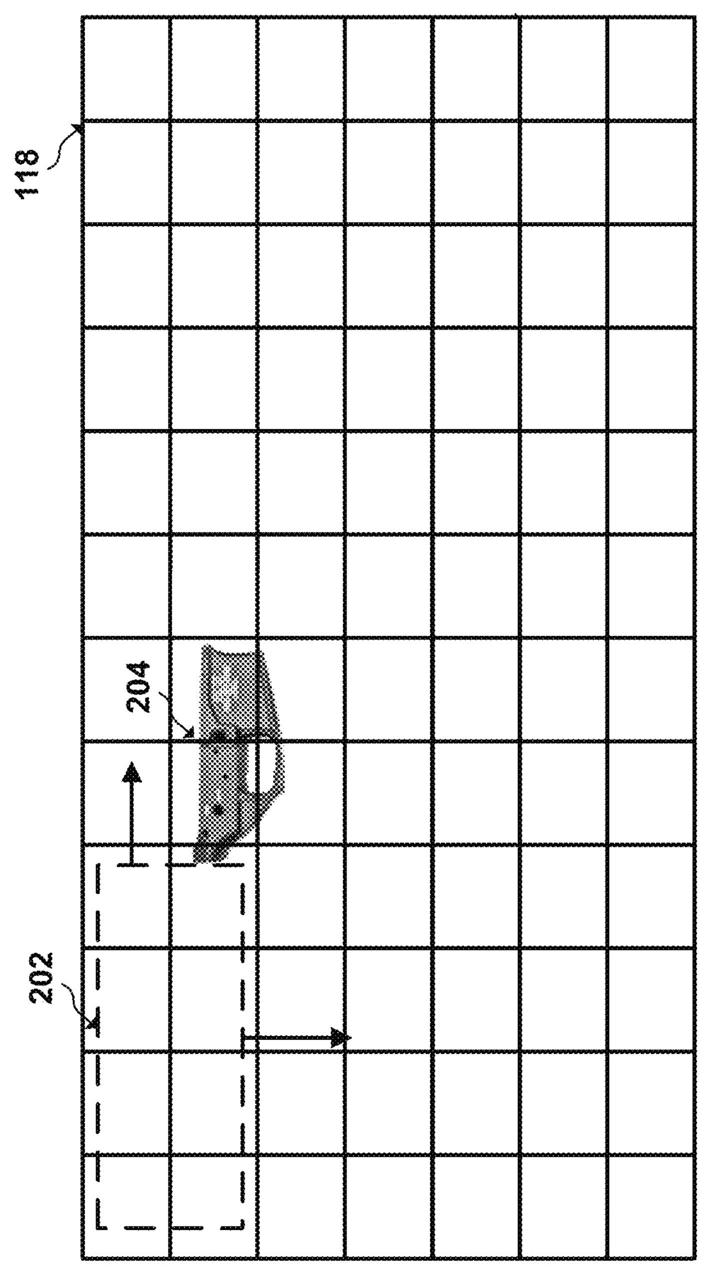
FIG. 2 is a conceptual diagram illustrating operation of an example segmenter in accordance with this disclosure.

FIG. 2 is a conceptual diagram illustrating operation of an example segmenter in accordance with this disclosure. A classification engine, such as classification engine 104 of computer system 100 of FIG. 1, may perform the techniques of FIG. 2 to identify a region of a captured image that is likely to contain an item. The techniques described with respect to FIG. 2 may be performed by, e.g. classification engine 104, and more particularly, normalizer 116, and segmenter 120, as some examples.

At a high level, segmenter 120 attempts to identify regions of captured image 114 that are likely to contain items. To identify such regions that may contain items, segmenter 102 may first generate a convolutional feature map from a captured image. Segmenter 120 may iteratively pass a set of anchor boxes over each position of captured image 114. Segmenter 120 may apply a weight matrix to generate a vector for a given anchor box-position combination. Segmenter 120 may then apply a classification matrix and a regression matrix to determine whether the pixels within a given bounding box are likely to contain a representation of an item. If segmenter 120 determines that an anchor box is likely to contain a representation of an item, segmenter 120 may output the contents of the anchor box to classification engine 104 for further analysis.

Before analyzing a captured image for potential regions that may contain a representation of an item, may perform preprocessing in the form of normalization. As an example, normalizer 116 may perform a technique referred to as z-score normalization. Z-score normalization takes a set of values (e.g. pixel values), and produces values having a common scale and a standard deviation equal to one. To perform z-score normalization on a captured image such as captured image 114, normalizer 116 first resizes (e.g. downsamples) the captured image to a lower resolution, for example 512×512 pixels along with additional information for each pixel (e.g. various metadata such as atomic number, material density, intensity, and the like). Next, normalizer 116 rescales each pixel value in captured image 114 by determining a mean of all the pixel values and a standard deviation of all the pixel values. In various examples, normalizer 116 may determine the standard deviation value during based on training data, and not based on pixel values of captured image 114. Normalizer 116 may determine the standard deviation value in various other manners as well.

After the mean and standard deviation have been calculated, normalizer 116 subtracts the mean from all the pixel values, and divides the difference of the pixel values resulting from the subtraction by the standard deviation. The result of the subtraction and division produces a normalized image 118 having a standard deviation equal to one and pixel values having an average value of zero. Normalizer 116 may perform normalization on a captured image in various other manners as well.

An example normalized image, e.g. normalized image 118 is illustrated in FIG. 2. Normalized image 118 may have a lower resolution than captured image 114. In the example of FIG. 2, normalized images 118 is illustrated as having a resolution of 12×7 pixels for the purpose of example. It should be understood that a normalized image may have a higher resolution than illustrated in the example of FIG. 2, e.g. 512×512 pixels.

After normalizing captured image 114, segmenter 120 may generate a set of anchor boxes sizes that segmenter 120 "passes over" the pixels of normalized image 118. The generated anchor boxes may have various sizes and aspect ratios. In some implementations, segmenter 120 may generate a set of anchor boxes having dimensions of 64×64, 128×128, and 256×256 pixels. Segmenter 120 may also generate anchor boxes having sizes 128×256, 256×128, 64×128, 128×64, 256×512, and 512×256, as some non-limiting examples. Segmenter 120 may generate anchor boxes in various other manners and in other sizes and aspect ratios as well.

In the example of FIG. 2, segmenter 120 has generated an anchor box 202 having an aspect ratio of 2:1 (width-to-length), and having dimensions 2×3 pixels for the purposes of example. Segmenter 120 may pass the anchor box 202, pixel-by-pixel, over each possible position for of captured image 118. Segmenter 120 may pass anchor box 202 over each possible position in left-to-right, top-to-bottom order, or vice versa, as some possible examples.

At each position of anchor box 202, segmenter 120 passes the pixels contained within the anchor box into a neural network. In some examples, the neural network of segmenter 120 may comprise an RPN. The neural network of the RPN applies a series of convolutional and pooling layers to generate a convolutional feature map. Segmenter 120 then applies a weighting matrix to generate a vector representation of the convolutional feature map.

Finally, the RPN applies a classification matrix and a regression matrix to the vector to generate various outputs. One such output is a candidate bounding box. To generate the candidate bounding box, the RPN applies a regression matrix to generate the coordinates and dimensions of the bounding box that the RPN determines most closely fits the a given item within the pixels of the anchor box-position combination.

Another such output is a classification score, which may be referred to herein as a "region proposal score." The region proposal score may indicate the confidence that the region proposal network has that the set of pixels contains an item. More particularly, the region proposal score may represent how well a given region of pixels defined by a position of a given anchor box encapsulates an item, and may be relatively agnostic to the type of item encapsulated. In various examples, a region proposal score may be between 0 and 1, inclusive. The region proposal score may be defined in various other manners as well.

In the example of FIG. 2, normalized image 118 contains a representation of a gun trigger 204. Candidate bounding boxes which are better-positioned to contain all the pixels that represent gun trigger 204 may generate higher region proposal scores, i.e. scores that are closer to 1 than to zero.

Responsive to generating the region proposal scores for each candidate bounding box, segmenter 120 may determine a set of candidate bounding boxes having a highest set of region proposal scores. In some examples, segmenter 120 may sort each candidate bounding box based on their respective region proposal scores, and may select a threshold number of candidate bounding boxes having topmost region proposal scores. As one example, the threshold number of candidate bounding boxes may be 1000. Other numbers of threshold values of candidate bounding boxes are possible as well. The candidate bounding boxes selected as having the topmost region proposal scores are referred to as candidate bounding boxes. Once all the candidate bounding boxes have been determined, segmenter 120 outputs the candidate bounding boxes meeting the threshold to classifier 124 classification engine 122 for classification.

III. Example Classification Engine

Figure 3:
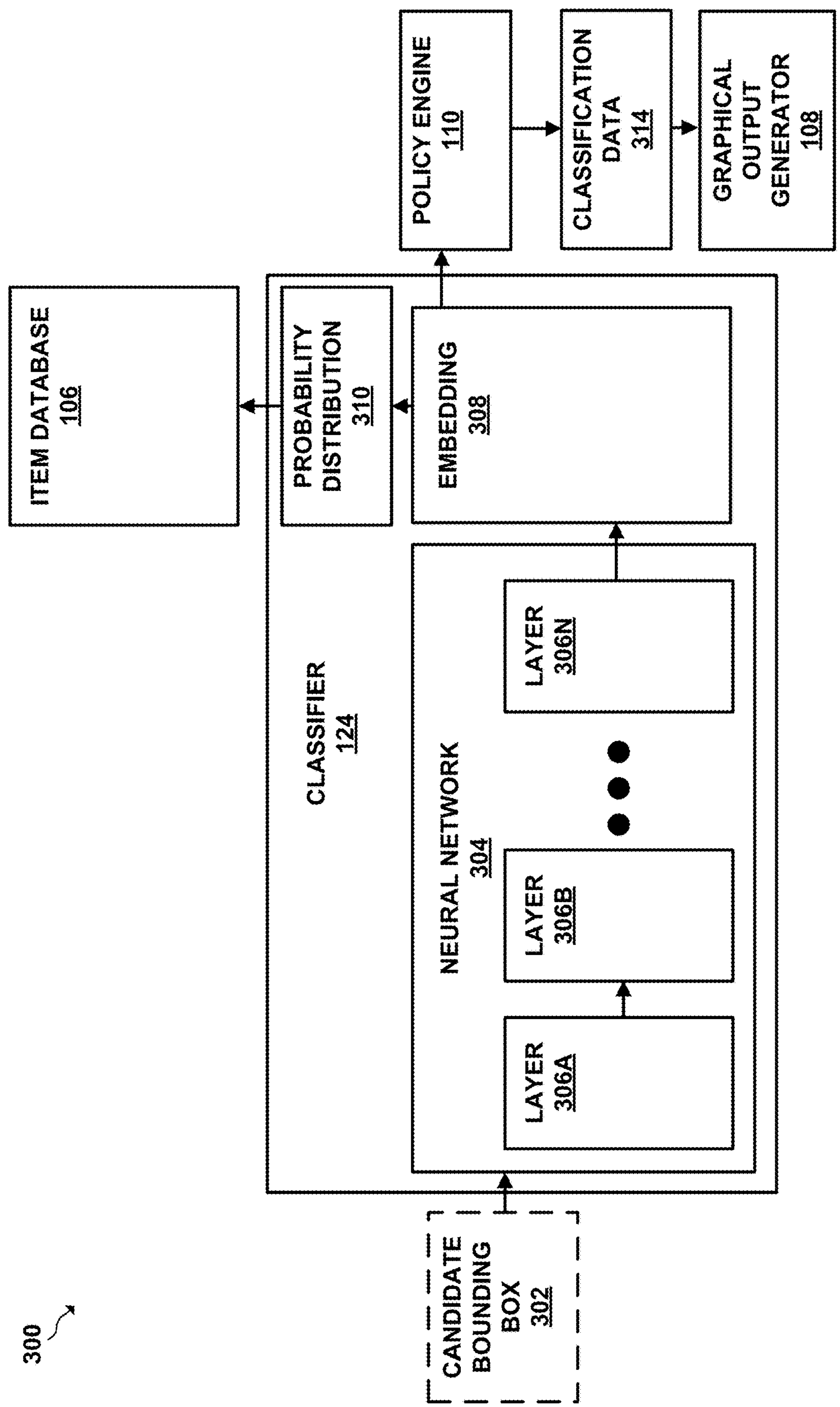
FIG. 3 is a conceptual diagram illustrating operation of a classifier in accordance with implementations of this disclosure.

FIG. 3 is a conceptual diagram illustrating operation of an example classification engine in accordance with implementations of this disclosure. In the example of FIG. 3, classifier 124 attempts to identify an item or a class of items within candidate bounding box 302. Classifier 124 accepts a candidate bounding box 302 as input. Candidate bounding box 302 may be defined by, and may encapsulate a set of pixels or other graphical elements. Candidate bounding box 302 may have been previously defined and outputted, e.g. by segmenter 120. Classifier 124 generates a probability distribution 310 comprising respective values, each of which indicates that candidate bounding box 302 contains a respective item or class of item.

Classifier 124 may comprise a neural network 304 comprising multiple layers 306A-306N, where N is any integer. Neural network 304 may comprise a neural network such as a residual neural network. The neural network of classifier 124 analyzes a region of pixels defined by a candidate bounding box, and passes the pixels or representations thereof through neural network 304 beginning with the "shallower" layers, e.g. layer 306A, and 306B, and ending with the "deeper" layers of neural network 304 until each layer of neural network 304 has been traversed.

Neural network 304 takes a set of pixels defined by a candidate bounding box 302 as input. Classification engine 104 may resize the pixels defined by a given candidate bounding box, e.g. candidate bounding box 302 to a standard size or resolution as part of the process of inputting a candidate bounding box to neural network 304. As one example, classification engine may resize a given set of pixels defined by a bounding box to a resolution 228×228 pixels). Classification engine 104 then feeds the standardized set of pixels into neural network 304. Each subsequent layer of neural network 304 identifies increasingly more complicated features from the inputted pixels relative to the previous layer, and each subsequent layer may transform the representation of the previous layer to a different representation relative to the previous layer's representation.

Neural network 304 may comprise multiple layers. Shallower layers of the neural network 304 may identify lower-level (e.g. simpler) features from a given set of pixels, and deeper layers may identify higher-and-higher level (e.g. more complex) features from the candidate bounding box. Each layer may determine features from the pixels of the resized candidate bounding box, and may transform the representation to a different representation that encapsulates the higher-level detailed features. More particularly, neural network 304 may comprise a set of layers that alternate between convolutional layers and pooling layers. Each layer of neural network may have a different associated set of kernels.

To apply a given kernel, neural network 304 performs a convolution process on a set of neighboring pixels. The convolution process expresses a given pixel as a weighted sum of the pixel and its neighboring pixels in which the weights for each pixel are defined by the elements of a set of kernel matrices. As an example, one or more layers of the classification neural network may apply a modified Sobel kernel, which is a set of two 3×3 matrices that may be applied to sharpen the edges of a given set of pixels.

A pooling layer may selectively downsample regions of a feature map generated by an input to the pooling layer by determining a set of regions and applying a pooling function to each of the regions in the set. One such example of a pooling function may comprise a max-pool function. The max-pool function may identify a maximum value (e.g. a pixel value or a value from a feature map) from a given region, retain the maximum value, and may discard all other values in the region.

Neural network 304 may alternate between convolutional layers and pooling layers. Each subsequent convolutional layer applies its associated convolution to the output of the preceding pooling layer, and each pooling layer applies its associated pooling function to the output of the preceding convolutional layer. The classification engine neural network repeats this process of alternatively performing convolution and pooling until neural network 304 has performed the respective convolution or pooling operations associated with each layer of the neural network. Based on the output of applying all the convolutional and pooling operations, the classification engine neural network outputs a set of feature maps having reduced dimensionality, referred to as an embedding, e.g. embedding 308. Embedding 308 may represent various features that the neural network has detected in the pixels of a given candidate bounding box.

Once all the layers of the neural network have applied their respective associated functions, classifier 124 generates a multi-dimensional vector, referred to as an embedding, e.g. embedding 308. Embedding 308 represents a transformation of the pixels within candidate bounding box 302 to a vector space. The vector space may represent various features that neural network 304 has identified in candidate bounding box based on a set of features identified during a training phase. As an example, embedding 308 may comprise a 4096-dimensional representation of a given candidate bounding box that represents the features that neural network 304 identified within the given candidate bounding box. Embedding 308 may take various other forms as well.

After neural network 304 has generated embedding 308, the neural network 304 may apply a weight matrix to embedding 308 to map embedding 308 to a vector in an n-dimensional space. Classifier 124 may then apply a function to the n-dimensional vector resulting from the application of the weight matrix to generate a probability distribution 310 that indicates similarities between the pixels within a given candidate bounding box and various classes of known items. One such function that the classification engine may apply to the n-dimensional vector may be a softmax function, which generates a probability distribution, e.g. probability distribution 310, comprising a set of probability values that are all between zero and one, and which have a sum total equal to one. Classifier 124 may apply various other functions to generate probability distribution 310 as well.

Probability distribution 310 may thus comprise a set of respective confidence values. Each confidence value may indicate a similarity between the given candidate bounding box and a respective class of item. Thus, probability distribution 310 comprises confidence values that indicate respective likelihoods that a given candidate bounding box is correctly classified as containing any of various classes of items. Probability distribution 310 may comprise values that are between 0 and 1, as one possibility. The sum of the values of probability distribution 310 may have a sum equal to one. As an example of such a probability distribution, probability distribution 310 may comprise a set of three values, which indicate the similarity between a confidence between three classes of items, such as a knife, a gun, and a laptop. In this example, the contents of the given candidate bounding box may contain a laptop, so the respective confidence values may be: 0.03, 0.01, and 0.96, respectively. Probability distribution 310 may take various other forms as well.

Classifier 124 may select candidate base regions that match a given item or class of item having with a probability greater than a threshold value. As examples, the threshold probability value may be 0.95. Responsive to identifying an item or class of item that matches a given candidate bounding box with greater than the threshold probability, classifier 124 may determine that the item or class of item has been identified in the given candidate bounding box. Responsive to identifying a given item or candidate item in a given candidate bounding box, classifier 124 may output information related to the identified item and/or class of item to graphical output generator 108 to cause graphical output generator 108 to generate a graphical representation, e.g. graphical representation 112. Classifier 124 may identify items, sub-items, classes of items, and the like in various other manners as well.

IV. Example Operations for Classifying Items

Figure 4:
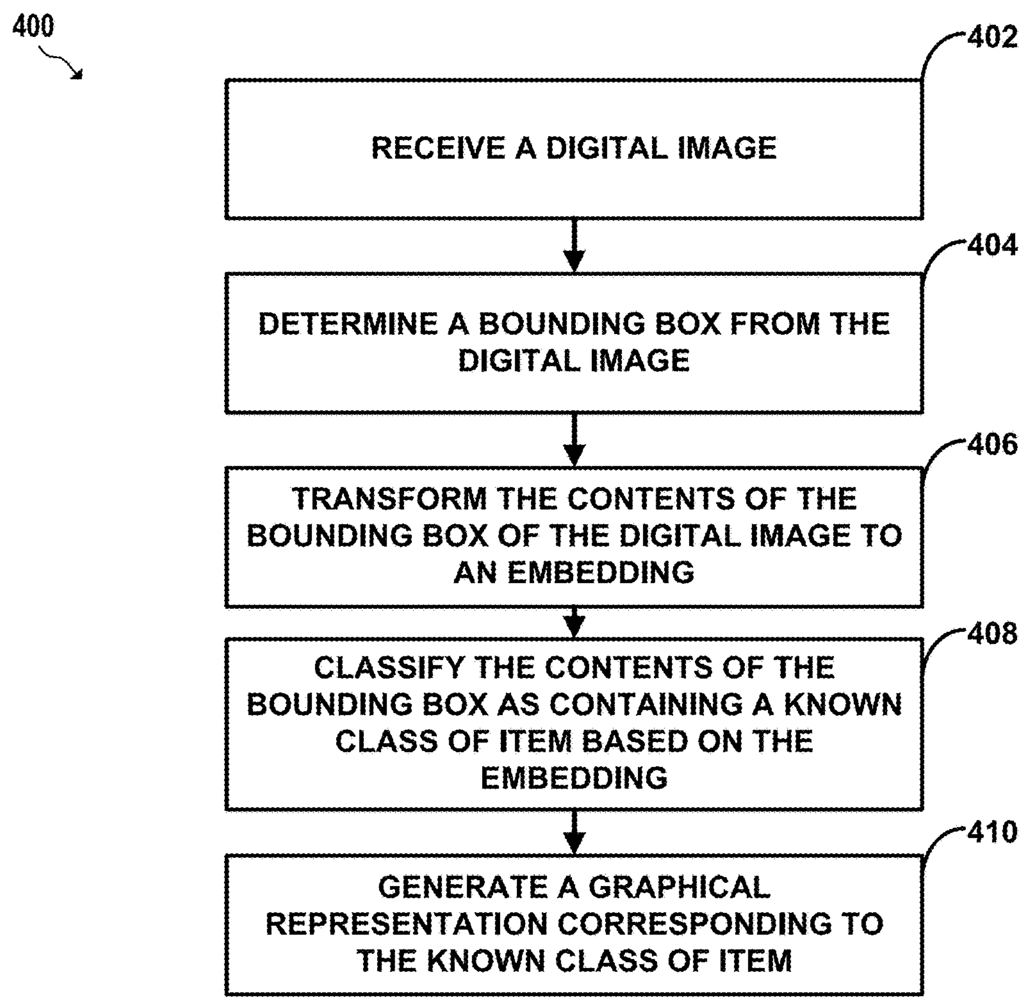
FIG. 4 is a flow diagram illustrating operations for classifying an item from a captured image.

FIG. 4 is a flow diagram illustrating example operations for classifying an item from a captured image. To help describe some of these operations, flow diagrams may be referenced to describe combinations of operations that may be performed. In some cases, each block may represent a module or portion of program code that includes instructions that are executable by a processor to implement specific logical functions or steps in a process. The program code may be stored on any type of computer-readable medium, such as non-transitory computer-readable media. In other cases, each block may represent circuitry that is wired to perform specific logical functions or steps in a process. Moreover, the blocks shown in the flow diagrams may be rearranged into different orders, combined into fewer blocks, separated into additional blocks, and/or removed based upon the particular embodiment.

As noted above, disclosed herein is a computer system that is configured to generate graphical output related to objects identified based on image data. For purposes of illustration, the example functions are described below as being carried out by computer system 100 of FIG. 1 and/or computer system 300 of FIG. 3, but it should be understood that various other devices, systems, and/or platforms may perform the example functions.

In the example of FIG. 4, a classification engine, e.g. classification engine 104 and/or graphical output generator 108 of FIG. 1 may perform some or of the blocks illustrated in method 400. At block 402, classification engine 104 may receive a digital image, e.g. captured image 114, that represents an object scanned by one of detection devices 102. After receiving the digital image, normalizer 116 may perform normalization on the captured image, e.g. using a technique such as z-score normalization, to produce a normalized image. In some examples, classification engine 104 may also downsample the captured image.

At block 404, classification engine 104 and more particularly, segmenter 120 may determine a region of the digital image that is likely to contain an item, e.g. a candidate bounding box. Segmenter 120 may generate a set of anchor boxes, move each anchor box of the set of anchor boxes across each position of the normalized image generated in block 402, and analyze each anchor box-position combination with a neural network to generate a candidate bounding box. Segmenter 120 may also determine a region proposal score for each candidate bounding box using the neural network. Segmenter 120 may output a candidate bounding to classifier 124 if the candidate bounding box has a high enough region proposal score.

At block 406, classification engine 104, and more particularly, neural network 304 of classifier 124 may transform the candidate bounding box, to an embedding, e.g. embedding 308 of FIG. 3. The embedding may comprise a representation of the region in a vector space. The vector space may comprise a multi-dimensional space in which each dimension of the space may correspond to features that neural network 304 determined based on the training data images of known classes of items. Thus, the embedding derived from the region may represent respective strengths that each of the previously-determined features are likely to be present in the region of the captured image.

At block 408, neural network 304 of classifier 124 may classify the candidate bounding box as containing a given class of item. Classifier 124 may classify the region as containing a known class of item based on probability distribution 310, which classifier 124 may generate by applying a weighting matrix to embedding 308. Classifier 124 may then classify the region as containing a known item if the confidence value for the known item in the probability distribution is greater than a threshold value, e.g. 0.95. Classification engine 104 may output information related to the classification to graphical output generator 108.

At block 410, responsive to determining that the candidate base region contains a class of item, graphical output generator 108 may generate a graphical representation, e.g. graphical representation 112, based on the class of item. In some implementations, graphical output generator 108 may generate graphical representation 112 based on the classified item, and/or information related to the classified item. The received identification information related to the identified item may indicate a type, name, or class of the classified item, as some examples.

As an example, the information that graphical output generator 108 may receive information for a classified item may indicate a make, model or other identifier for the item. For a bottle of shampoo, the identifier may simply be "shampoo." However, for a more specific item, such as a handgun (or, in some embodiments, part of a handgun), the identifying information may be "handgun," or a specific manufacturer, e.g. "Smith & Wesson." The identification information may take other forms as well.

As another example, if the identification information indicates the classified item is a handgun, graphical output generator 108 may generate a graphical representation comprising an indication of the classified item. The indication may comprise, e.g. an icon of a gun as one example. Graphical output generator 108 may generate the indication which may be textual or graphical, for a given classified item at a location corresponding to the location of the identified item in a captured image. Other examples of generating identifiers for an identified item based on identification information are possible as well.

Graphical output generator 108 may also receive classification information related to a classified item. The received classification information may comprise taxonomy (i.e. classification) information for the one or more classified items. The taxonomy information may comprise, e.g. text strings that indicate one or more levels of a taxonomical hierarchy to which the classified item belongs. The classification information may take other forms as well. In some implementations, graphical output generator 108 may generate an indication of the class to which the classified item belongs. As an example, graphical output generator 108 may generate a textual indicator of a class, and may position the indicator at a location corresponding to the given classified item in graphical representation 112.

Based on received identification information and/or classification information for a given identified item, graphical output generator 108 may access policy engine 110 to obtain policy information, such as threat information, for a given classified item. The threat information may be a relative indicator of the identification confidence, e.g. high, medium, or low, or a percentage, in various examples. The threat information may also indicate metadata about a given item's threat, such as a threat confidence level. The threat confidence level may indicate a confidence that the classified item is a threat. In some examples, the confidence level may be a percentage value (e.g., "99%"). The threat confidence level may take various other forms as well.

In still other implementations the received information may comprise identification confidence level information. The identification confidence level may indicate a confidence that classification engine 104 correctly identified a given item. As some examples, the confidence level may be a relative indicator of the identification confidence, e.g. high, medium, or low. In some examples, the confidence level may be a percentage value that indicates how confident classification engine 108 was when classifying a region as containing a given item. The confidence level may base based on the probability distribution, e.g. probability distribution 126. The confidence level information may take various other forms as well.

In some implementations, computer system 100 may attempt to identify sub-items or components of the known item from the digital image containing the classified item or from other digital images. Computer system 100 may utilize similar techniques to those described above to identify sub-items or components of the known item. Computer system 100 may employ various other techniques including other machine learning techniques as well.

In some implementations, computer system 100 may attempt to identify classify items or sub-items based on the characteristics of those items. The sub-items or components may fall into various levels of a classification taxonomy. As an example, a component may be classified as an electronics device, a more specific component such as a "motherboard," or a specific component such as an "ASUS Z270E." Various other classification levels are possible as well.

In various implementations, computer system 100, and more specifically, classification engine 104 may attempt to identify anomalies associated with an item. Some examples of anomalies may comprise an item, sub-item, or component that has been modified, or an item that has a missing sub-item or component.

In some examples, computer system 100 may determine whether an item, sub-item or other component has been modified based on the dimensions of the component, items, or sub-item. As an example, classification engine 104 may obtain geometric dimensions of an identified item, sub-item or component based on data from detection devices 102 and a captured image, and may compare the observed dimensions for the item to normal dimensions for that item or class of item. The normal dimensions may be stored in item database 106 or policy engine 110, as some examples. If classification engine 104 determines that the observed dimensions exceed the normal dimensions by greater than a threshold tolerance level, classification engine 104 may determine that the given item, sub-item, or class of item has been modified. In some examples, classification engine 104 may determine the normal dimensions for a given item or class of items based on machine learning analysis of training data. In other examples, the normal dimensions for a given item, sub-item, or class of items may be determined based on user input. In still other examples, classification engine 104 may dynamically determine the normal dimensions for a given item dynamically and based on observed data. Classification engine 104 may determine the normal dimensions in various other manners as well.

In another implementation, computer system 100 may determine whether an item, sub-item, or component is anomalous based on material characteristic data that may be included, e.g. as metadata associated with a captured image. As an example, computer system 100 may receive material characteristic data from detection devices 102 as metadata along with each captured image. The material characteristic data may indicate data about each pixel or various regions of the captured image. The material characteristic data may indicate an atomic number, material density, or other various characteristics for a pixel or region of pixels.

Classification engine 104 may determine various characteristics for a classified item, sub-item, or component based on the material characteristic data. As an example, classification engine 104 may determine a material density for a classified item or component. As another example, classification engine 104 may determine percentages of organic matter and inorganic matter within a given classified item or component. Classification engine 104 may compare the material characteristic data for a given classified item or component to previously-determined material characteristic data for the item or component, which may be stored, e.g. in item database 106. If classification engine 104 determines that the material data differs from the previously-determined material characteristic data by a threshold margin, classification engine 104 may determine that the given item or component has been modified or has a missing component or sub-item, and is therefore anomalous.

In various implementations, classification engine 104 may adaptively determine normal material characteristic or geometric dimension values for items, sub-items, and/or components. In other examples, the normal material characteristics may be predefined. The normal material characteristics may be defined in various other manners as well.

In some implementations, computer system 100 may generate a graphical representation responsive to determining that a given item, sub-item, or component is anomalous. The graphical representation may indicate various information about the anomalous item, sub-item, or component.

As an example, graphical output generator 108 may generate a graphical representation that indicates a location of a modified component or a missing sub-item. The graphical representation may indicate the location of the missing component or modified sub-item with different levels of granularity. As examples, the graphical representation may emphasize an entire item having a missing component or may just emphasize a missing component of the item. As another example, graphical output generator 108 may generate a graphical representation of that includes an image of a closest-matching item to the anomalous item. In some examples, graphical output generator 108 may include the image of the closest-matching item in a graphical representation along with the anomalous item. In still other examples, a graphical representation may comprise a composite image derived from multiple images of items similar to the anomalous item. The composite image may combine features from multiple images into a single image. For instance, if an anomalous item were a "Macbook Pro," the graphical representation may comprise a composite image of a "Macbook Pro."

In another implementation, a graphical representation generated responsive to identifying an anomalous item, sub-item, or component may comprise various representations of control data related to geometric dimensions of an identified item. The control data may specify normal geometric dimensions and/or material compositions for a control item as well as an anomalous item. The control data may indicate geometric dimension and/or material control values and/or ranges of values for non-anomalous items. The graphical representation may also comprise geometric dimensions and/or material control data related to the item, sub-item, or component identified as being anomalous. Graphical output generator 108 may receive an indication of user input from a user input device that is communicative with graphical output generator 108, and may generate an updated graphical representation based on the indication of user input. As an example, a user input may select a particular region of a graphical representation, and in response, graphical output generator 108 may generate an updated graphical representation comprising control data for the selected region. Graphical representations comprising control data may be generated in various other manners as well.

In still other implementations, classification engine 104 may identify sub-items or components of an item that pose a threat when combined or associated, and graphical output generator 108 may generate a graphical representation based on the identified combination. Responsive to identifying an item in a region, classification engine 104 may identify various sub-items or components that are associated with the identified item. Classification engine 104 or policy engine 104 may determine various combinations of the identified sub-items and/or components, and may determine if any of the combinations pose a threat. Graphical output generator 108 may generate a graphical representation based on the combinations. As one example, a 9-volt battery may pose a threat if combined with organic material and a 9-volt battery. Responsive to determining that the combination of a 9-volt battery, laptop, and sufficient organic material are present in one or more images as part of a classification process, graphical output generator 108 may generate a graphical representation that indicates the combination of items that poses the threat. As another example, classification engine 104 may identify a kettle, which may contain metal pieces inside. Responsive to receiving an indication that the kettle has been identified, graphical output generator 108 may generate a graphical representation indicating that the combination of kettle and metal pieces had been identified, and pose a threat. As still other examples, classification engine 104 may classify a region as a laptop, and may determine that a motherboard is missing from the laptop, or that the laptop contains an explosive, and that the laptop therefore poses a threat.

In another implementation, classification engine 104 may identify a combination of items, sub-items, and graphical output generator 108 may generate a graphical representation of a combination of items that may be difficult for a user to identify, or may be difficult to communicate to human users. Responsive to identifying such complex or difficult-to-identify combinations, graphical output generator 108 may generate graphical representation that indicates that the identified combination poses a threat, but may indicate a reason for indicating the combination poses a threat.

The graphical representation generated responsive to classifying an item, sub-item, or component as anomalous may take various other forms as well.

The generated graphical representation may indicate whether the modification or missing sub-item may pose a threat, e.g. whether or not an item is safe despite a modification or missing sub-item. As examples, graphical output generator 108 may generate a graphical representation emphasizing modified item or an item having missing components if the alteration of the item poses a threat, and may not emphasize the modified item otherwise. Graphical output generator 108 may generate a graphical representation based on detecting an anomaly in an identified item in various other manners as well.

Figure 5:
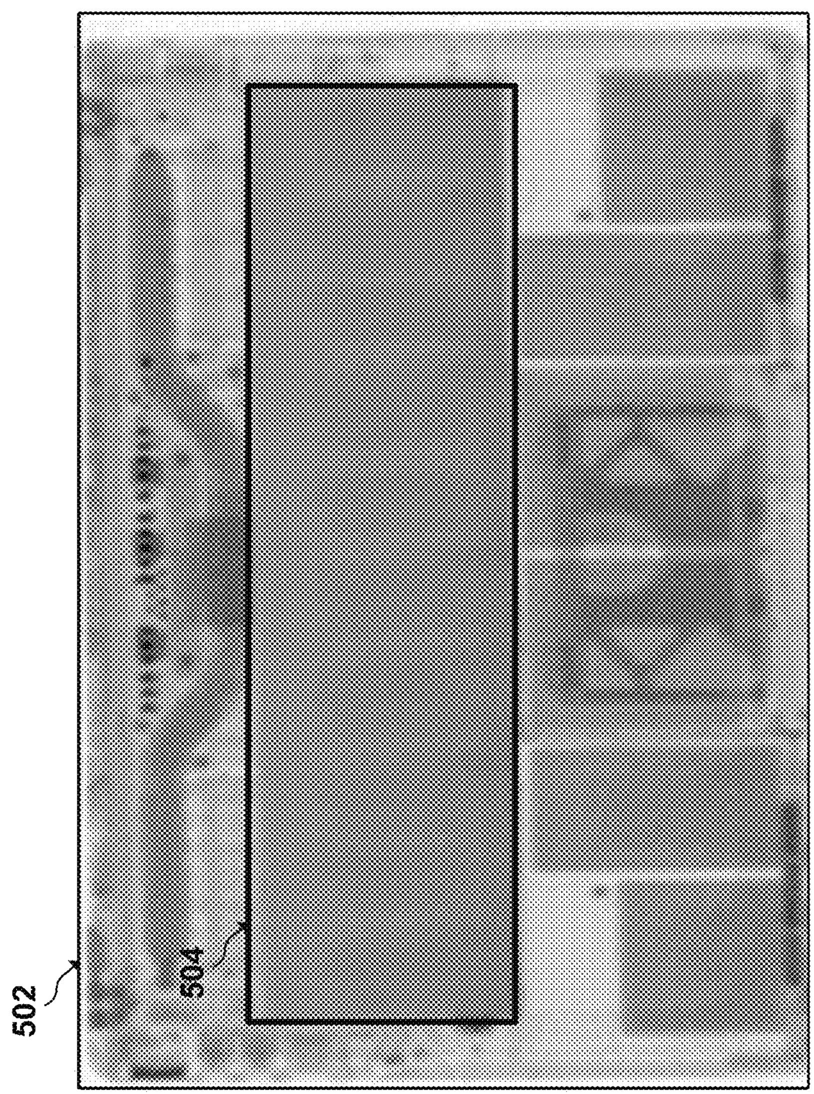
FIG. 5 illustrates an example conceptual diagram of classifying an item having an anomaly.

FIG. 5 illustrates an example conceptual diagram of classifying an item having an anomaly. In the example of FIG. 5, classification engine 104 may determine that a graphical illustration has an anomaly. Graphical output generator 108 may generate a graphical representation 500 based on the determined anomaly.

In the example of FIG. 5, classification engine 104 may identify a laptop 502, e.g. using segmenter 120 and classifier 124. Laptop 502 may comprise a 2015 15" Retina Macbook Pro in this example. Responsive to or in parallel with identifying laptop 502, classification engine 502 may also identify various sub-items or components of laptop 502 such as a battery 504.

Classification engine 104 may determine various information for each sub-items and components of laptop 502. Classification engine 104 may determine material information, such as a percentage or quantity of organic material and inorganic material in laptop 502, and in battery 504. Classification engine 104 may also determine geometric dimensions for each of laptop 502 and battery 504. Classification engine 104 may compare the material information and geometry to an acceptable "normal" value for laptop 502. Classification engine 104 may determine the normal values for geometric dimensions and material information from item database 106, and/or policy engine 110, and/or external data sources 128, as some non-limiting examples.

In some examples, classification engine 104 may determine the normal values for material and/or geometric dimensions of items based on training data. In other examples, the normal values may be determined based on user input. In still other examples, the normal values may be determined adaptively based on statistical information. In some examples, the normal values may be based on statistical measure such as an average of values obtained from various models of laptops, or a class of laptops, that are similar to laptop 502. Normal geometric values for a given item or class of item may be determined in various other manners as well.

In the example of FIG. 5, laptop 502 has a battery 504. Classification engine 104 may classify sub-items, such as battery 504, using a neural network in some implementations. The neural network for identifying sub-items or components may be similar to the other neural networks described herein. In some implementations, the neural network may be trained based on a set items, items that pose a threat, specific threats, and/or sub-items. The neural network may be trained in various other manners as well.

In this example, classification engine 104 may determine that battery 502 is oversized. based on metadata included with a captured image of laptop 502 obtained from a detection device of detection devices 102 as an example. Classification engine 104 may determine that battery 502 is oversized in various other manners as well. To determine that battery 504 is oversized, classification engine 104 may first compare the dimensions of battery 504 to normal values for a battery. In this example, classification engine 104 determines that the dimensions of battery 504 exceed the normal dimensions for a similar battery. Additionally, classification engine 104 may determine that the dimensions of battery 504 exceed the normal dimensions for a similar battery by a threshold margin.

Based on the determination that the battery is oversized, classification engine 104 may cause graphical output generator 104 to generate a graphical representation. In some examples, the generated graphical representation may indicate that the battery is oversized. The graphical representation may contain an indication of the dimensions of the battery relative to similar batteries. For instance, the graphical representation may indicate that the dimensions of battery 504 are 8"×4", and a similar battery of normal size is 3"×4". In some examples, graphical output generator 108 may include the material information about battery 504 in the graphical representation. For instance, the graphical representation may indicate that the battery is 80% organic material, and 20% metal, which may be in a normal range for similar batteries. In some examples, the graphical representation may include a visualization, such as a bar chart of the material composition and/or dimensions for items, such as a laptop 502, and/or battery 504. Other visualizations are possible as well. The graphical representation may also emphasize a region of the graphical representation emphasize battery 504. Graphical output generator 108 may generate a graphical representation in various other manners as well.

V. Example Operations for Generating Graphical Representations

Figure 6:
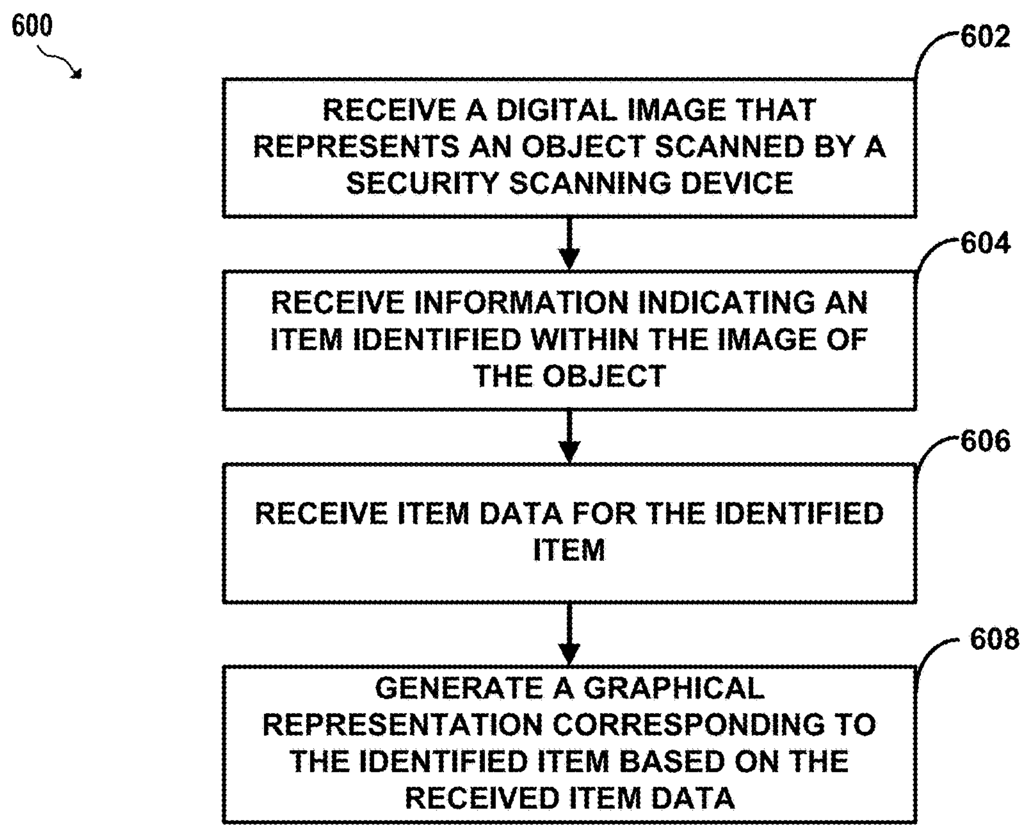
FIG. 6 is a flow diagram illustrating the algorithm's process of identifying and marking an identified object.

FIG. 6 is a flow diagram illustrating operations for generating graphical output related to object identification. To help describe some of these operations, flow diagrams may be referenced to describe combinations of operations that may be performed. In some cases, each block may represent a module or portion of program code that includes instructions that are executable by a processor to implement specific logical functions or steps in a process. The program code may be stored on any type of computer-readable medium, such as non-transitory computer-readable media. In other cases, each block may represent circuitry that is wired to perform specific logical functions or steps in a process. Moreover, the blocks shown in the flow diagrams may be rearranged into different orders, combined into fewer blocks, separated into additional blocks, and/or removed based upon the particular embodiment.

As noted above, disclosed herein is a computer system that is configured to generate graphical output related to objects identified based on image data. For purposes of illustration, the example functions are described below as being carried out by computer system 100 of FIG. 1, but it should be understood that various other devices, systems, and/or platforms may perform the example functions.

In the example of FIG. 6, a computer system, such as computer system 100 of FIG. 1, may perform the blocks illustrated in method 600. At block 602, graphical output generator 108 may receive a digital image that represents an object scanned by a detection device, e.g. one of detection devices 102. Graphical output generator 108 may receive the digital image from classification engine 104, which may in turn receive the digital image from one of detection devices 102.

As described above, classification engine 104 may identify one or more items within the digital image. Classification engine 104 may output item identification data related to the one or more identified items to graphical output generator 108.

At block 604, graphical output generator 108 may receive information indicating an item (again, item and sub-item may be used interchangeably) identified within the image of the object. In various implementations, the received information may comprise geometric information, e.g. boundary information and/or location information corresponding to the identified item. The boundary information may comprise sets of coordinates or sets of vertices that form a bounding polygon around the identified item, as well as one or more sets of coordinates that may indicate a location of the identified item. Other examples of geometric information are possible as well.

At block 606, graphical output generator 108 may receive item data for the identified item. Examples of the identified item may comprise metadata, such as classification and policy metadata, policy data (e.g. from policy engine 110) item identification data (e.g. from item data 106 or classification engine 104), as some non-limiting examples.

The received identification data corresponding to the identified item may indicate a type, name, or class of the identified item. As an example, the received information may indicate a make, model or other identifier for an identified item. For a bottle of shampoo, the identifier may simply be "shampoo" or "bottle." However, for a more specific and/or more threatening item, such as a handgun, the identifying information may be "handgun," or a specific manufacturer, e.g. "Smith & Wesson," or in some cases, the specific type of gun, e.g., a Smith & Wesson "M&P®9 M2.0" pistol. The identification data may take other forms as well.

Graphical output generator 108 may generate a graphical representation based on the received item identification data. As an example, if the item data comprise identification data that identifies a handgun (or, in some embodiments, even part of a handgun), graphical output generator 108 may generate an icon of a gun, and may generate a graphical representation that includes the icon. Graphical output generator 108 may generate the textual or graphical identifier for a given object at a location corresponding to the location of the identified item in a captured image. Other examples of generating identifiers for an identified item based on identification data are possible as well.

Graphical output generator 108 may also receive classification data for one or more identified items in a captured image. The received classification data may comprise taxonomy (i.e. classification) data for the one or more identified items. The taxonomy data may comprise, e.g. text strings that indicate one or more levels of hierarchy to which the identified item belongs. The classification data may take other forms as well. In some implementations, graphical output generator may generate an indication of the taxonomical class to which one or more of identified items belong. As an example, graphical output generator 108 may generate a textual indicator of a taxonomical class, and may locate the indicator at a location corresponding to the given identified item in graphical representation 112.

Based on received identification data and/or classification data for a given identified item, graphical output generator 108 may access policy engine 110 to obtain policy data, which may include threat data, for a given classified item. The threat data may include a confidence level for the classification, which indicates how likely classification engine 104 believes a given item was correctly classified. The confidence level may be a relative indicator of the identification confidence, e.g. high, medium, or low, or a percentage, in various examples. The threat data may also indicate metadata about a given item's threat, such as a threat confidence level. The threat confidence level may indicate a confidence that classification engine had that a given identified item was a threat. In some examples, the confidence level may be a percentage value that indicates how confident classification engine 108 was when identifying the given item. The threat confidence level may take various other forms as well.

In still other implementations the received item data for a given may comprise an identification confidence level information. The identification confidence level may indicate a confidence that classification engine 104 correctly identified a given item. As some examples, the confidence level may be a relative indicator of the identification confidence, e.g. high, medium, or low. In some examples, the confidence level may be a percentage value that indicates how confident classification engine 108 was when identifying the given item. The received identification confidence level information may take various other forms as well.

In yet another embodiment, the confidence level may factor in the degree to which the item is obstructed, the number of overlapping items, the resemblance of an item to other known items or taxonomies of items, the unfamiliarity of a given item, or a number of other factors that could increase, decrease, or reinforce the confidence level. The confidence level may also take into account the degree to which x-rays or other penetrating waves or fields are able to image the items, and may decrease to indicate an inability for such waves or fields to penetrate the items, which may be cause by densely-packed items or objects of a high density or atomic number, among other factors. The confidence may be unrelated to the similarity of the object to a known object, as in another embodiment the classification engine may recognize a modified version of an item. In yet another embodiment, the system may specify different confidence levels for various classifications along an item's proposed taxonomy, and in one embodiment may specify a confidence level for the exact make and model of an electronic and another confidence level for whether it is a laptop, for example. In yet another embodiment, a confidence level may be generated by forward propagation of a pre-trained neural network. In yet another embodiment, a confidence level may be generated by pre-trained non-neural-network machine learning techniques. In yet another embodiment, the confidence level may represent the confidence of the classification of an item separately from the confidence of the segmentation of the item's geometry. In yet another embodiment, the confidence level may be manually, dynamically, or algorithmically adjusted based on the time of analysis, checkpoint location, and intelligence chatter related to items that may be in the process of being analyzed. In yet another embodiment, the confidence levels may be associated with the classification of an item, with an area being analyzed, or with individual pixels being analyzed. In yet another embodiment, the confidence level may be associated with material properties associated with a classified item, a continuous area, and/or multiple items or areas in proximity of each other.

At block 608, graphical output generator 108 may generate, for output at a display, a graphical representation, e.g.

graphical representation 112, corresponding to the identified item based on the received item data. The graphical representation may indicate a location of the identified item, and the generated graphical representation may comprise at least a portion of the digital image corresponding to the identified item. Example conceptual diagrams of graphical representations generated by graphical output generator 108 will now be described with respect to FIGS. 7-14, and 16.

A. Indications for Graphical Representations

Various examples of generating graphical representations which include various visual elements, referred to as "indications" will now be described.

Figure 7:
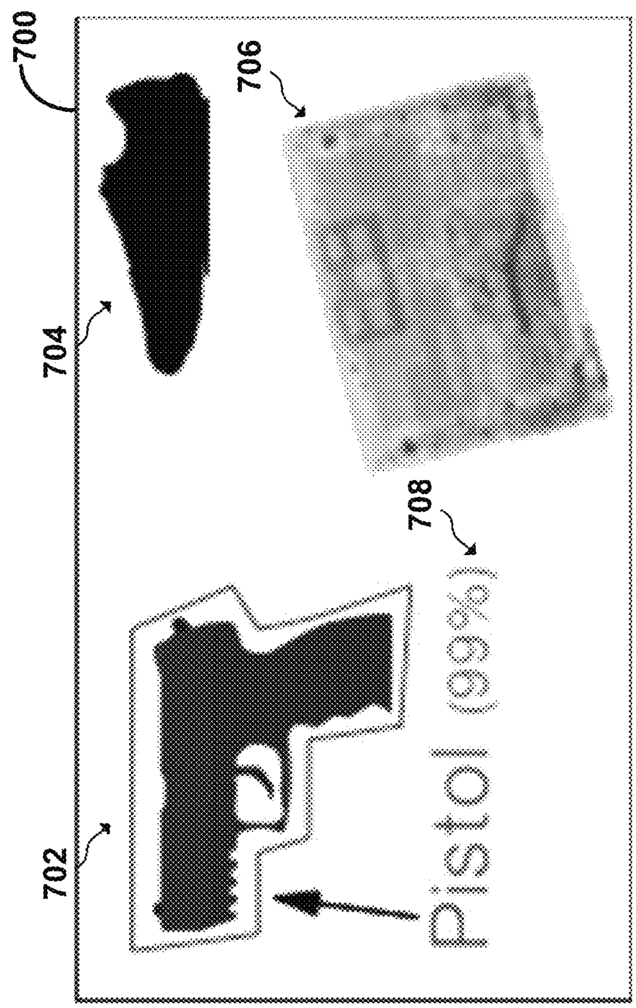
FIG. 7 illustrates an example conceptual diagram of a graphical representation of an identified item.

FIG. 7 illustrates an example conceptual diagram of a graphical representation of an identified item. FIG. 7 illustrates an example of an implementation in which graphical output generator 108 may generate graphical indications, such as a bounding polygon, and a textual indicator comprising an indication of a confidence level. In the implementation of FIG. 7, graphical output generator 108 may receive geometry data for an identified item from classification engine 104. Based on the received geometry data, graphical output generator 108 may generate a graphical representation 700 comprising a bounding polygon 702 corresponding to the identified item.

In the example illustrated in FIG. 7, graphical output generator 108 may receive one or more possible geometries for an identified item. Based on the item, graphical output generator 108 generates a graphical representation 700, which is based on a received captured image of an object containing the item. Graphical output generator 108 may receive identification, which indicates that classification engine 108 identified a handgun 702, a shoe, 704, and a laptop 706. Graphical output generator 108 may receive information, which may comprise geometry data indicating the location and/or boundary information for each of these identified items. In the example of FIG. 7, graphical output generator 108 generates a bounding polygon around handgun 702 based on the received geometry data for handgun 702. In some examples, the bounding polygon that graphical output generator 108 generates may follow the contours of the identified item, as illustrated in FIG. 7. In other examples, the bounding polygon may be a bounding rectangle or bounding box. The border of the bounding polygon may be solid or dashed in various examples. In various examples, graphical output generator 108 may generate a flashing graphical representation to emphasize an identified item.

In the example of FIG. 7, graphical output generator 108 may also receive identification data for handgun 702, shoe 704, and/or laptop 706. Based on the received identification data for each identified item, graphical output generator 108 may generate a textual indicator 708 corresponding to identified handgun 702. In this example, the textual indicator says "pistol." In various other examples, the textual indicator may comprise a name, class, threat level, classification confidence level (e.g., "99%"), or threat confidence level received in the identification data, as some examples. The textual indication may take other forms as well.

In an embodiment, an operator can move or toggle between identified, specific items (or areas that contain classified items) of a scanned image given that items 702, 704, and 706 have been classified by computer system 100. Using a keyboard, touchscreen, or some other input mechanism to the computer system 100, the operator can show (or zoom) a single item, such as handgun 702 on a display screen. More information can then be provided on the screen about the item 702 to the operator. If so desired, in some embodiments, the operator may request the computer system 100 to re-scan a specific item (e.g., rescan the handgun 702), so that additional information may be collected on the item. Similarly, the operator may toggle to shoe 704 and laptop 706 if more information about those items is needed (e.g., kind of shoe or type of laptop). In some embodiments, the operator may request classification 104 to process specific certain region. In yet other embodiments, the operator may request to view additional identification metadata from classification engine 104 related to individual items or regions. In some embodiments, the operator may choose to view additional probable classifications from classification 104 related to a region or item.

Figure 8:
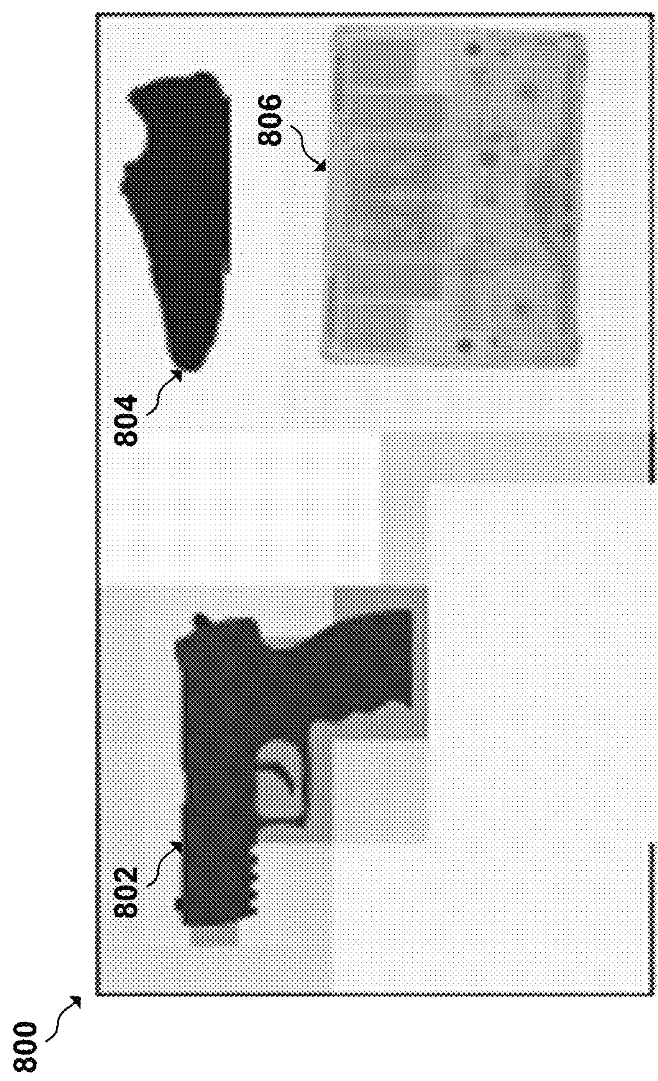
FIG. 8 illustrates an example conceptual diagram of a generated graphical representation comprising identified items.

FIG. 8 illustrates an example conceptual diagram of a generated graphical representation comprising identified items. More particularly, FIG. 8 illustrates an example of an implementation of generating a graphical representation 800 comprising an indication that emphasizes certain regions and de-emphasizes other regions of a captured image. In the example implementation illustrated in FIG. 8, graphical output generator 108 may receive item information from policy engine 110 and/or classification engine 104. The item data may comprise identification data, geometry data, and metadata from classification engine 104 for various identified items. These identified items may comprise a handgun 802, shoe 804, and a laptop 806. Based on the received item data, graphical output generator 108 may access threat data from policy engine 110 to determine a threat level for the identified items. Based on the received threat data, graphical output generator 108 may determine that handgun 802 poses a high threat, shoe 804 poses a low threat (e.g. is safe), and laptop 806 poses a moderate threat.

In response to determining the threat for each identified item, graphical output generator 108 may generate graphical indications of the threat for some or all of the identified items. As one example, graphical output generator 108 may generate a heatmap. The heatmap may comprise a gradient (e.g. a color gradient or the like) that represents items having a high threat with a surrounding region having more pronounced coloration or saturation, and may represent lower threat items or safe items with a less pronounced coloration or saturation. Various other potential colorations or graphical representations of constituting a heatmap are possible as well.

In the example of FIG. 8, graphical output generator 108 generates indications that emphasizes the handgun by placing a dark square over or behind a region surrounding the handgun. Graphical output generator 108 generates an indication comprising a lighter square around the laptop. Graphical output generator 108 may not generate a region surrounding the shoe because the shoe may not pose a threat.

In another implementation, not pictured in FIG. 8, graphical output generator 108 may generate an indication comprising a textual representation for one or more identified items based on determined threat data for one or more given identified items. The textual representation may indicate the threat of each item. As one example, graphical output generator 108 may generate a textual representation in an area near handgun 802 that says "high," or another value indicating a high threat level, e.g. a high percentage value. As another example, graphical output generator 108 may generate a textual indication for items that are not a threat. As an example, graphical output generator 108 may determine that shoe 804 does not pose a threat, and may generate a textual representation corresponding to the shoe indicating the shoe does not pose a threat, i.e. is safe. Graphical output generator 108 may generate indications of threat levels for shoe 804 and laptop 806 as well. In some examples, graphical output generator 108 may not generate a threat level for an identified item that classification engine 104 has determined may not be a threat.

Figure 9:
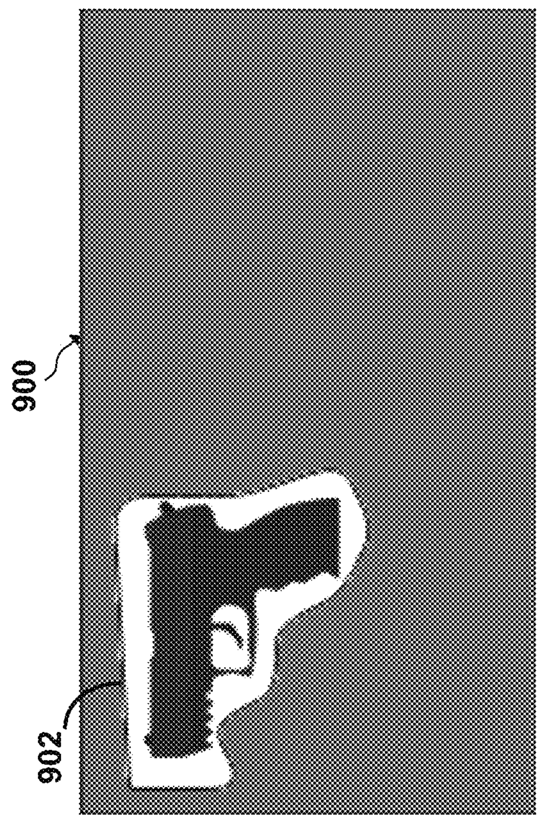
FIG. 9 illustrates a conceptual diagram of a generated graphical representation comprising an identified item.

FIG. 9 illustrates an example of a generated a graphical representation of an identified item. More particularly, FIG. 9 illustrates an example of an implementation of generating a graphical representation 900 that obscures an area of a captured image. Graphical output generator 108 may generate a graphical representation that obscures a region of a graphical representation in various manners.

In an example of the implementation illustrated in FIG. 9, graphical output generator 108 may receive a captured image of an object that contains an identified item. In addition to receiving the captured image, graphical output generator 108 may receive information related to the identified item. The item data may comprise information such as metadata, geometry data, classification data, threat data, and the like for the identified item. Graphical output generator 108 may receive the item data from, e.g. classification engine 104, policy engine 110, and/or item database 106, as some non-limiting examples.

In the example of FIG. 9, graphical output generator 108 may determine, based on the received item data, that one identified item present in the received image is handgun 902. In this implementation, graphical output generator 108 may determine a threat level associated with the identified item, e.g. handgun 902, based on policy data, e.g. from policy engine 110. Based on the policy data, graphical output generator 108 may determine that handgun 902 has a relatively high threat level. In turn, based on the threat level, graphical output generator 108 may generate a graphical representation, e.g. graphical representation 900 that may obscure various areas, or other items in the various areas, based on the threat levels of identified items in those areas.

In some examples, responsive to determining that an identified item has a high threat level, graphical output generator 108 may generate a graphic representation that emphasizes a region surrounding the identified item having a high threat level and de-emphasizes an area not associated with the identified item. In the example of FIG. 9, graphical output generator 108 generates a mask that obscures for a region not associated with handgun 902. The mask may be transparent over the region associated with handgun 902, and obscures an area not corresponding to the identified handgun 902. Graphical output generator 108 may determine the region associated with the identified item based on bounding data received from classification engine 104.

In some examples of this implementation, graphical output generator 108 may generate a graphical representation having regions not associated with an identified high threat item (e.g. a safe item) to be transparent and regions associated with an identified item not to be transparent. Graphical output generator 108 may generate transparent or non-transparent regions corresponding to the identified high threat items as well.

It should be understood that graphical output generator 108 may emphasize and de-emphasize, and/or obscure regions in other manners, and based on information other than threat data as well.

B. Generating Graphical Representations Based on Identified Items and Sub-Items

Figure 10:
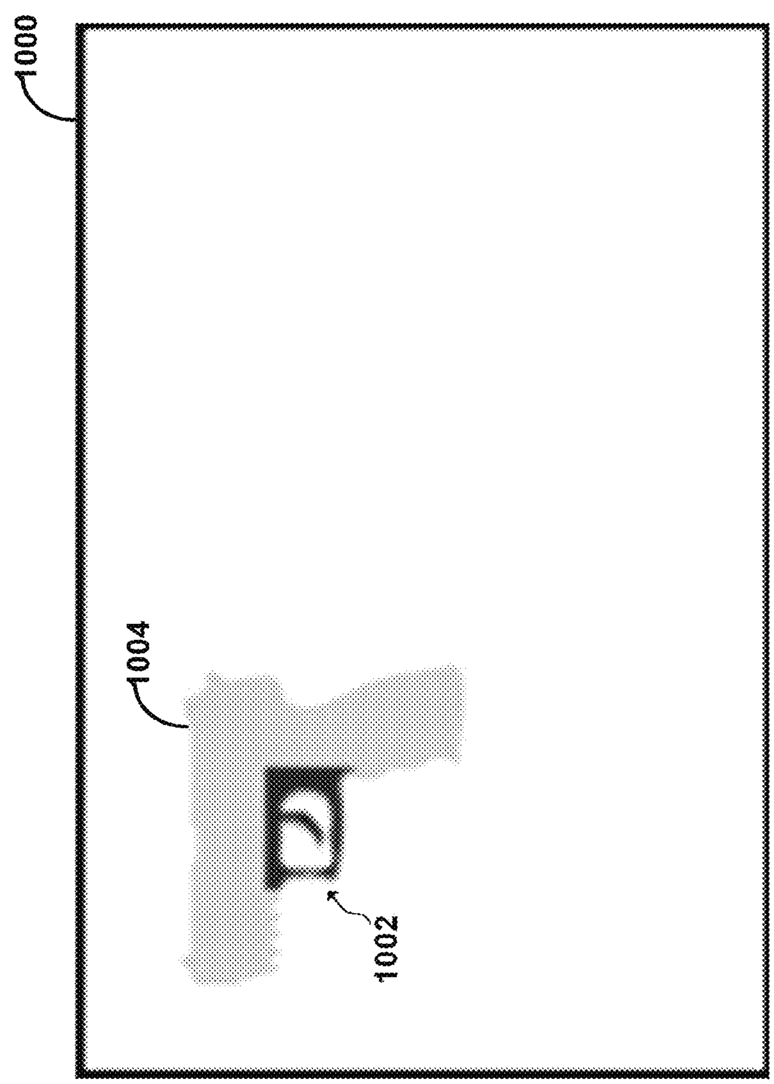
FIG. 10 illustrates an example of a generated a graphical representation of an identified item.

FIG. 10 illustrates an example conceptual diagram of a generated graphical representation comprising an identified item. In an implementation, graphical output generator 108 may generate a graphical representation responsive to identifying a sub-item of a given item. In the example of FIG. 10, classification engine 104 analyzes an image of an object received from one of detection devices 102. Based on the analysis, classification engine 104 identifies a sub-item 102, which is a component of a handgun, and more specifically, a trigger of a handgun. However, in this example, classification engine 104 may not have identified items or sub-items (also referred to herein as "components") that may be combined to form an entire handgun.

In other embodiments, graphical output generator 108 may generate a graphical representation responsive to identifying an item, which may be displayed as an overlay above or alongside the item. In yet other embodiments, graphical output generator 108 may display various representations including an image of a known item corresponding to the identified item, an image of a known item in the class corresponding to the identified item, an image of a known item in the class corresponding to the identified class with a given region. In yet other embodiments, the representation may take the form of a 3D model, rotating 3D model, or the display of multiple representations simultaneously or sequentially.

Graphical output generator 108 may receive item data from classification engine 108 indicating that sub-item 102 has been identified as well as data indicating that the captured image that contains a representation of sub-item 102. The item data may indicate the location of the sub-item, geometry data for the sub-item, classification data, policy data, metadata, and other information as described above. Based on the received item data, graphical output generator 108 may generate a graphical representation 100 comprising a representation of the sub-item and that emphasizes the location of sub-item 102.

In some implementations, graphical output generator 108 may also determine, e.g. based on item data obtained from item database 106 or classification engine 104 an item of which the sub-item is a component. Graphical output generator 108 may generate a graphical representation 104 of the item or class of item to which the sub-item belongs, in this case, a handgun (in some instances, the specific type of gun for which the sub-item belongs, may be displayed). In some examples, graphical output generator 108 may generate a graphical representation of the item to which the sub-item belongs such that the graphical representation of the item aligns with the position of the sub-item in the image as illustrated in graphical representation 100.

FIG. 10 comprises a graphical representation 1000, which in turn comprises a graphical representation of a handgun 1004. In various examples, graphical output generator 108 may generate a graphical representation of a sub-item that differs relative to the graphical representation of the item to which the sub-item belongs. As an example, in FIG. 10, the graphical representation of the handgun differs (e.g., in color) relative to the graphical representation of the trigger sub-item.

In some implementations, graphical output generator 108 may receive an indication that multiples components of an item have been identified by classification engine 104 in different objects, e.g. in two different bags. In such a case, graphical output generator may generate a graphical representation that combines representations or images of each identified sub-item into a composite graphical representation. Graphical representations of items and sub-items may take various other forms as well.

Figure 11:
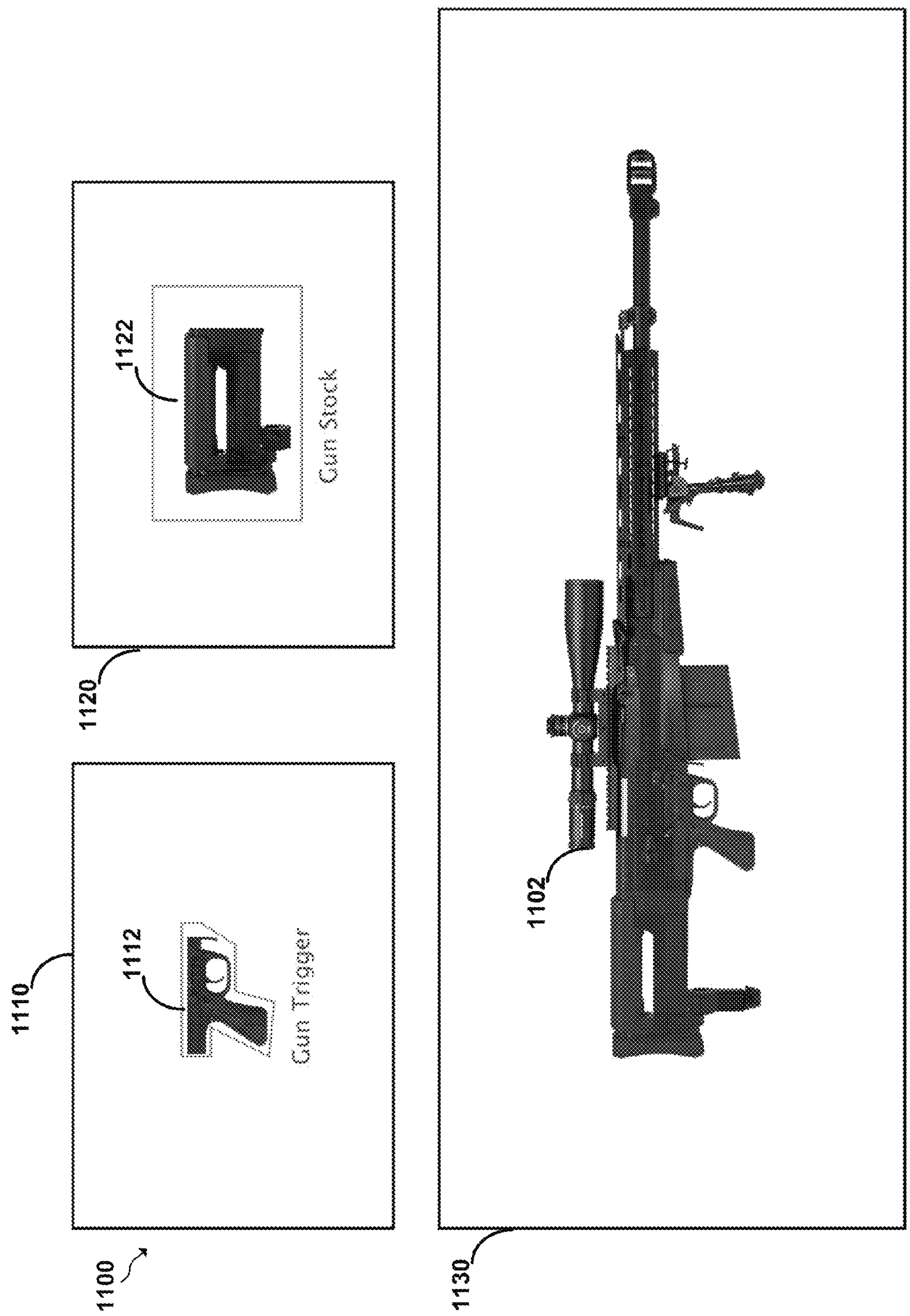
FIG. 11 illustrates an example of a generated a graphical representation of an identified item.

FIG. 11 illustrates an example conceptual diagram of a generated a graphical representation of an identified item. In an example of an implementation illustrated in FIG. 11, graphical output generator 108 may generate a graphical representation based on items or sub-items identified from images of a plurality of different objects. In this implementation, graphical output generator 108 may generate a graphical representation that in turn comprises multiple sub-items that are identified from at least two different scanned images and/or a graphical representation of an item to which the multiple sub-items belong.

More particularly, graphical output generator 108 may receive a first image of a first object. The first image may comprise a representation of a first identified sub-item. Graphical output generator 108 may also receive a captured image of a second object. The second object may comprise a representation of a second sub-item. The first object and the second object may be scanned by different scanning devices or a same scanning device.

In the example of FIG. 11, graphical output generator 108 generates a graphical representation 1130. Graphical output generator 108 may generate graphical representation 1130 based on item data received from classification engine 104 and/or policy data received from policy database 110. Based on the received item data, graphical output generator 108 may identify a gun stock sub-item 1112 from a first captured image 1100, and a gun trigger sub-item 1122 from a second captured image 1120.

Based on the identified sub-items, graphical output generator 108 may generate graphical representation 1130, which includes a representation of a gun or class of gun to which gun stock 1112 and gun trigger 1122 may belong. Graphical representation 1130 also comprises gun stock 1112 from captured image 1110, from image 1100, and gun trigger 1122, from second captured image 1120. Graphical representation 1130 also indicates the locations at which gun stock 1112 and gun trigger 1122 are located or positioned within gun 1102.

Graphical generator 108 may generate graphical representations based on items or sub-items identified from a plurality of different in various other manners as well. In another implementation, graphical output generator 108 may determine that first and second sub-items have been identified in two separate images. Responsive to the determination, graphical output generator 108 may generate multiple graphical representations, each of which includes an identified item. Graphical output generator 108 may toggle or switch among the respective graphical representations for each image. In some examples, graphical output generator 108 may switch among the generated graphical representations responsive to receiving an indication of user input. Graphical output generator 108 may generate graphical representations of sub-items detected in different objects and/or different images in various other manners as well.

C. Generating Graphical Representations Responsive to User Input

Figure 12:
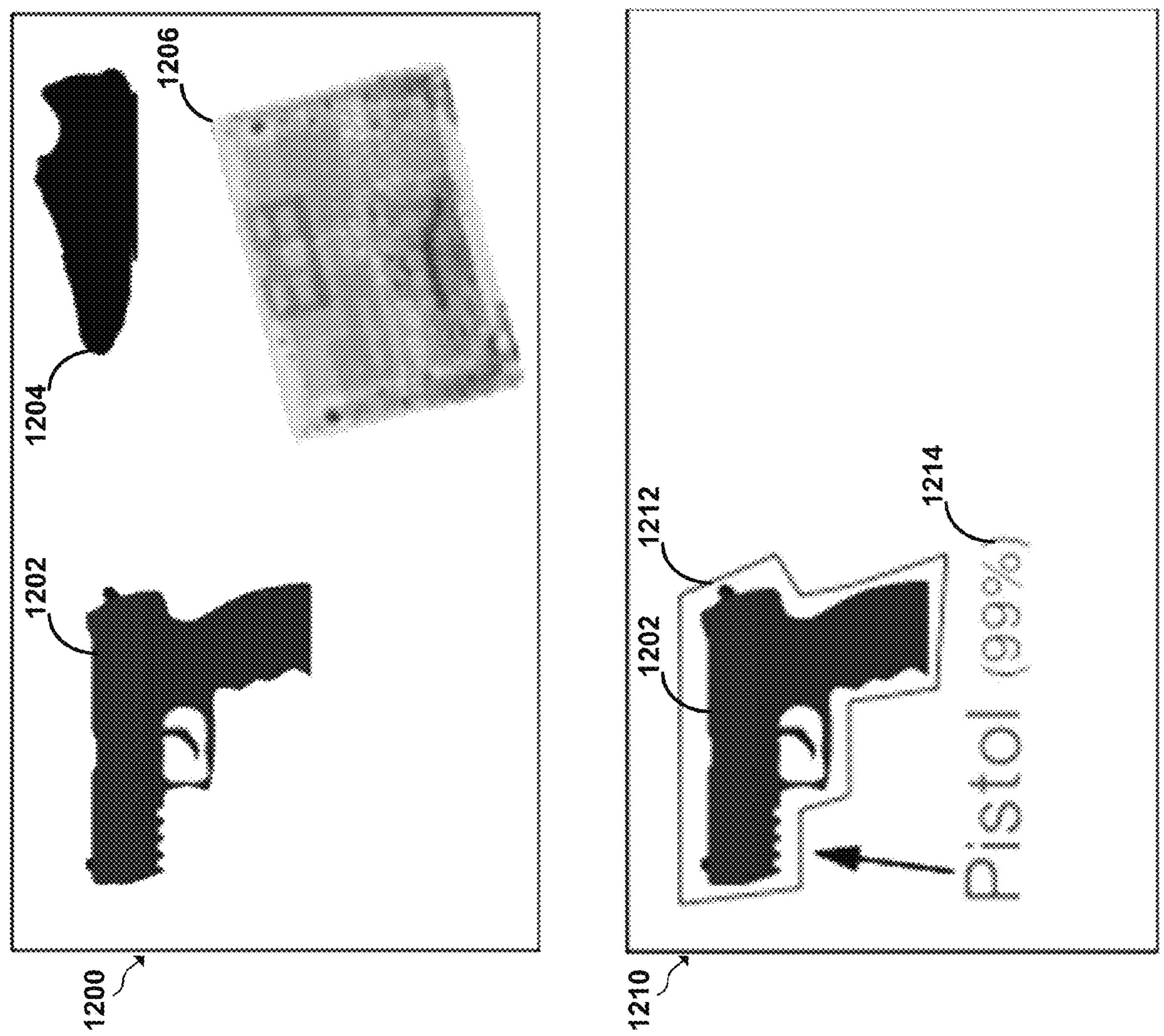
FIG. 12 illustrates an example conceptual diagram of generated graphical representations.

FIG. 12 illustrates an example conceptual diagram of graphical representations generated by graphical output generator 108. FIG. 12 illustrates an example of an implementation in which graphical output generator 108 may generate a graphical representation responsive to receiving an indication of user input.

In the example of FIG. 12, graphical output generator 108 first generates a graphical representation 1200 that in turn includes graphical representations of three identified items, a pistol 1202, a shoe 1204, and a laptop 1206. Graphical output generator 108 may generate graphical representation 1200 responsive to receiving various item data, such as identification data and image data from classification engine 104.

After graphical output generator 108 generates graphical representation 1200, a user may view graphical representation 1200. Based on the content of graphical representation 1200, a user may wish to view a given region of a graphical representation 1200 in greater detail. To view the given region in greater detail, the user may issue an input command, e.g. using an input device, such as a touchpad, control panel, buttons, keyboard, mouse, or the like, which may be coupled to computer system 100.

Graphical output generator 108 may receive an indication of the user input, and based on the indication, may determine a region of graphical representation 1200 that a user wishes to view in greater detail. Based on the determined region of the graphical representation, graphical output generator 108 may generate a more detailed version of the graphical representation. The more detailed version of the graphical representation may comprise additional or higher resolution pixel, polygonal, textural, or other image data for the determined region. The more detailed version of the graphical representation may also comprise textual or graphical indications, graphical representations of additional previously non-visible objects, or other additional graphical elements. By generating a more detailed version of a graphical representation, such as graphical representation 1200, a user of computing system 100 may be able to more precisely examine the determined region, and identify items within the determined region.

In the example of FIG. 12, responsive to receiving data about a given scanned object or scene, graphical output generator 108 may generate graphical representation 1200. Graphical representation 1200 comprises graphical representations of identified items, which include a pistol 1202, a shoe 1204, and a laptop 1206. A user may view graphical representation 1200, and may issue a user input indicating a given region, such as the upper-left corner of graphical representation 1200, which contains the graphical representation of pistol 1202. An input device may relay the user input to graphical output generator 108.

Responsive to receiving the user input, graphical output generator 108 may generate a more detailed graphical representation 1210 of the indicated upper-left corner of graphical representation 1200 to produce a more detailed graphical representation 1210. Graphical representation 1210 may be of higher resolution, may contain additional graphical elements, detail, and/or indications relative to graphical representation 1200 because additional non-occupied visual space may be available in the more detailed graphical representation 1210, e.g. graphical representation 1210. As one example, graphical output generator 108 may generate additional textual or annotations or graphical elements for a given identified item. In the example of FIG. 12, graphical output generator 108 adds a first annotation 1212 comprising a bounding polygon for pistol 1202, and a second annotation 1214, comprising a textual annotation for pistol 1202.

As another example, in response to receiving a user input to zoom-in on a given area, graphical output generator 108 may include additional identified and/or non-identified items in the more detailed version of the graphical representation, e.g. graphical representation 1210. As examples, graphical output generator 108 may show additional items, which were not previously displayed in a zoomed-out graphical representation. Some examples of such items may comprise items that were determined by classification engine 104 to be safe, or below a safety threshold. Graphical output generator 108 may generate graphical representations various other manners as well. It should be understood that these thresholds may be predefined, adaptively determined, and/or determined based on machine learning techniques.

D. Generating Graphical Representations Based on Criteria

Figure 13:
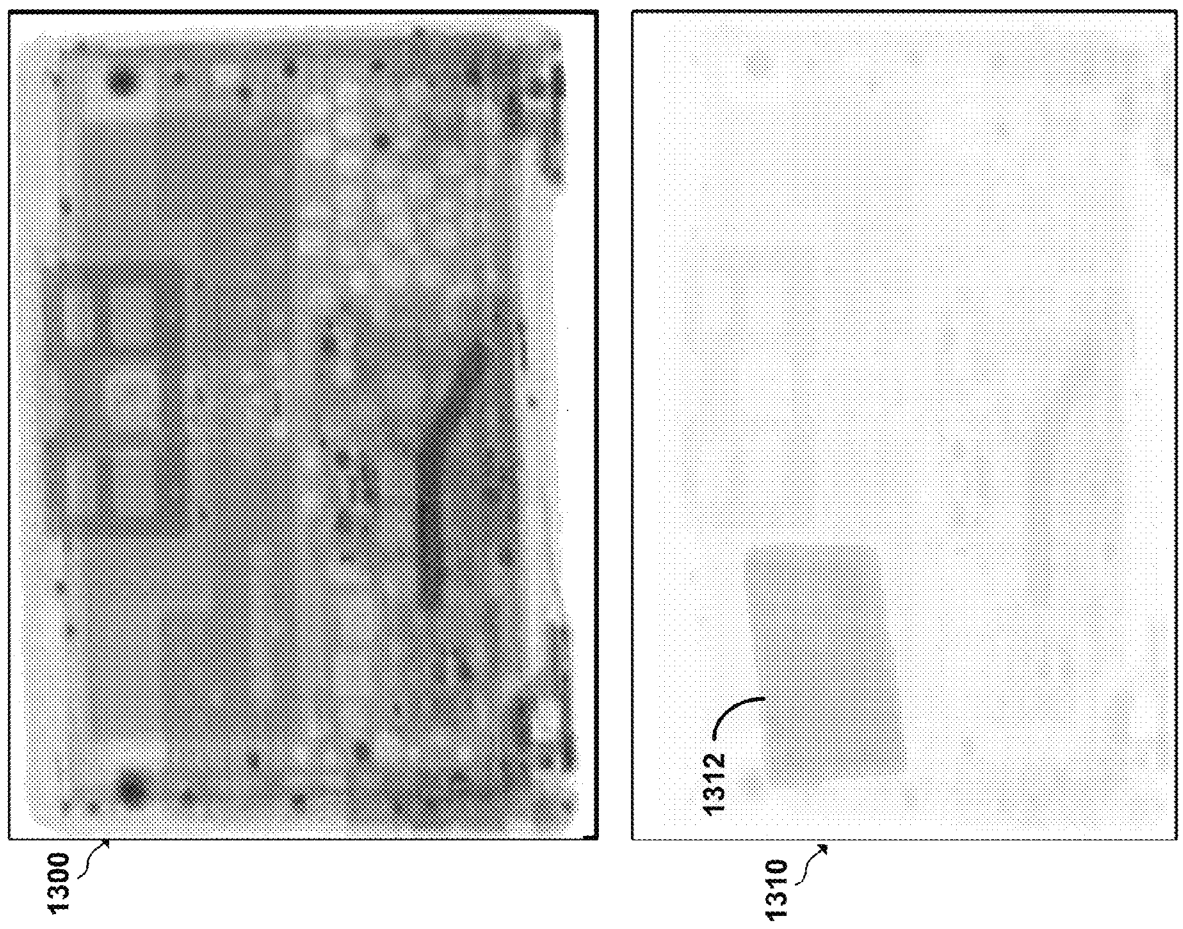
FIG. 13 is another example conceptual diagram of generating a graphical representation.

FIG. 13 is an example conceptual diagram of generating a graphical representation based on various criteria. In one implementation, graphical output generator 108 may filter detected items and sub-items based on filtering criteria, and may generate a graphical representation that includes items and sub-items that meet the filtering criteria. As an example, graphical output generator 108 may receive an indication of a user input from a user. The indication of user input may indicate filtering criteria, such as an item class, item identifier, or the like. Responsive to receiving the indication of the user input, graphical output generator 108 may generate a graphical representation comprising items meeting the filtering criteria, e.g. only items that have a given indicated item identifier, item class, or the like. As another example, responsive to receiving a user input indicating filter criteria, graphical output generator 108 may generate a graphical representation that excludes a given item or class of item. It should be understood that multiple filters may be applied or active at a given time, and that graphical representations may be generated based on various other filtering criteria.

In another implementation, graphical output generator 108 may receive a filtering criteria comprising a given set of item characteristics, and may generate a graphical representation based on the filtering criteria. As examples, graphical output generator 108 may generate a graphical representation that contains representations of items that do not meet the given characteristic. Other examples of characteristics are possible as well.

In the example of FIG. 13, graphical output generator 108 may receive data from classification engine 104 indicating that classification engine 104 has identified a laptop in a captured image, and responsive to determining that classification engine 104 has identified a laptop, may generate graphical representation 1300. Graphical representation 1300 comprises an illustration of the identified laptop, and may comprise various colored regions. Each of the colored regions may indicate various characteristics about the various regions of the graphical representation, such as material density, and atomic number, as some non-limiting examples.

In some examples, graphical output generator 108 may receive data from classification engine 104, detection devices 102, or another component of computer system 100 that may indicate characteristics about a given region of graphical representation 1300. Examples of such characteristics may comprise a region's atomic number or a material density, as some non-limiting examples. Based on the characteristic data, graphical output generator 108 may generate a second graphical representation 1310 that shows or excludes regions having a given characteristic, e.g. a given atomic number or a given material density. In the example of FIG. 13, graphical output generator 108 may receive characteristic data indicating a given atomic number. Based on the characteristic data, graphical output generator 108 may generate graphical representation 1310, which emphasizes a region 1312 having the given atomic number, and de-emphasizes other regions of the graphical representation. Various other manners of generating a graphical representation based on characteristic data are also possible.

Figure 14:
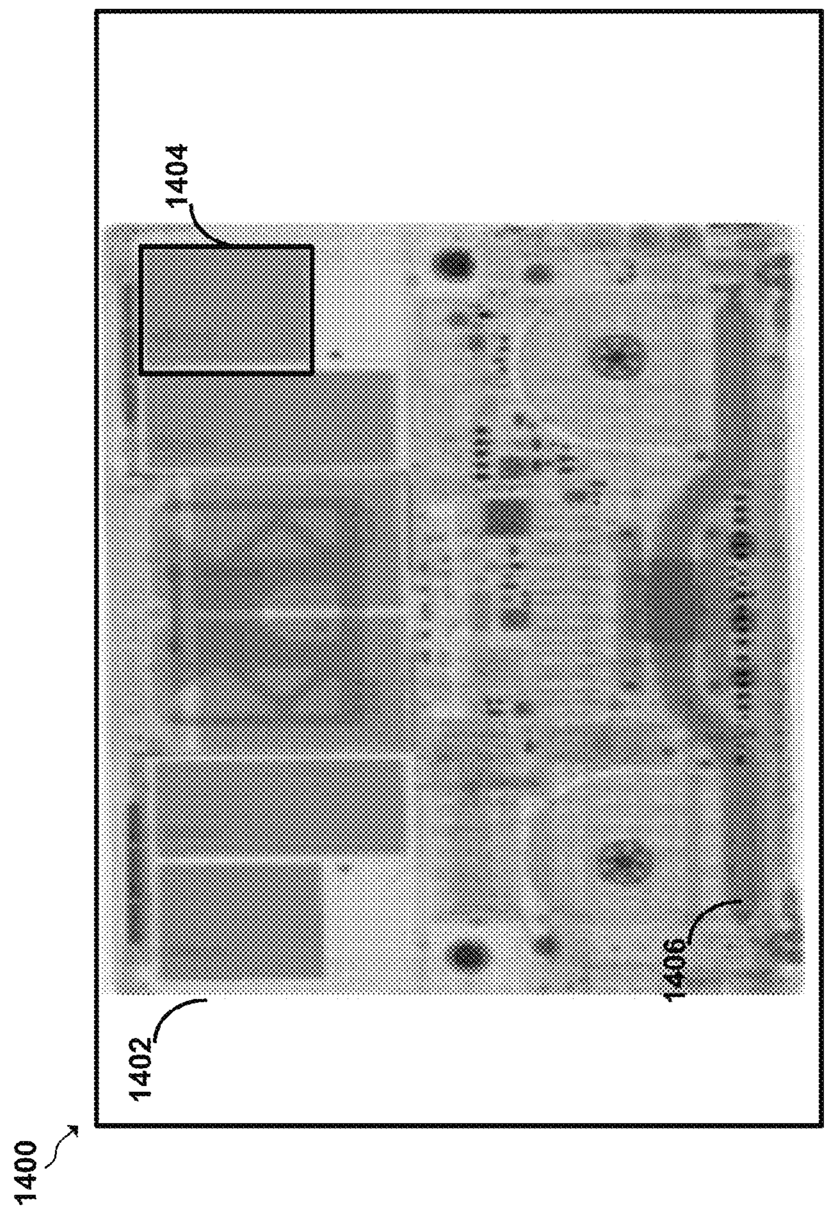
FIG. 14 illustrates an example of filtering items based on a characteristic.

FIG. 14 illustrates an example of filtering items based on a characteristic. In the example of FIG. 14, graphical output generator 108 may generate a first graphical output representation 1000, which includes a representation of an identified laptop 1402. Laptop 1402 may comprise various components and sub-items. As examples, laptop 1402 may comprise a motherboard, chassis, battery, cooling system, and various other components. In graphical representation 1400, callouts are illustrated for a cell of a battery 1404 and for metal components, e.g. of a cooling system 1406.

Graphical output generator 108 may receive an indication of a user input. The indication of the user input may specify that graphical output generator 108 should generate a graphical representation that includes certain identified items or sub-items, and excludes other identified items or sub-items. As one example, a user input may specify that battery items or sub-items of a laptop such as battery cell 1404 of laptop 1402 should be included or excluded in a given graphical representation. As another example, a user input may specify that the cooling apparatus 1406 of laptop 1402 should be included in or excluded from a graphical representation. Responsive to receiving such a user input, graphical output generator 108 may generate a graphical representation that includes or excludes a given item, sub-item, type, or class of items or sub-items.

In another implementation, graphical output generator 108 may generate a graphical representation that includes or excludes items or classes of items based on an indication of filtering criteria specified based on a user input. As an example, graphical output generator 108 may receive an indication of a user input from a user of computer system 100. The indication of user input may specify filtering criteria, such as an item class, item identifier, or the like. Responsive to receiving the indication of the user input, graphical output generator 108 may generate a graphical representation comprising items meeting the filtering criteria, e.g. only items that have a given item identifier, item class, or the like. As another example, responsive to receiving a user input indicating a filtering criteria, graphical output generator 108 may generate a graphical representation that excludes a given item, or class of item. As a more particular example, graphical output generator 108 may receive an indication that only items belonging to a weapon class should be displayed. Responsive to receiving the input, graphical output generator 108 may generate a graphical representation that comprises depictions of identified items that classification engine 104 has determined belong to the class of weapon.

In still another implementation, graphical output generator 108 may generate a graphical representation that includes or excludes a given set of items or sub-items based on whether the given set of items or sub-items are identified in a particular sequence, and/or whether a threshold number of items or sub-items have been identified, e.g. by classification engine 104. As an example, classification engine 104 may determine whether a given set of items or sub-items have been identified in a given sequence. The sequence may be specified based on user input or in various other manners. If graphical output generator 108 determines that a given set of items or sub-items have been identified in the given sequence, but are not identified in a given order, graphical output generator 108 may exclude the given set of items or sub-items from a graphical representation or may not emphasize the set of items or sub-items. However, if graphical output generator 108 determines, e.g. based on an indication from classification engine 104, that the given set of items has been identified in the given sequence, graphical output generator 108 may generate a graphical representation that includes representations of the given set of items or sub-items. The graphical representation may include an indication that the given set of items or sub-items were identified in the given sequence, in various examples.

In another implementation, graphical output generator 108 may include or exclude a given set of items or sub-items based on a determination whether graphical output generator 108 determines a given threshold number of items or sub-items have been identified. Classification engine 104 and/or graphical output generator 108 may keep track of a number of given items sub-items that belong to an item, class of items, or the like. As an example, graphical output generator 108 may keep compare a number of sub-items that have been identified and belong to or are components of a given item to a threshold number of sub-items. If the number of identified sub-items is less than a threshold, graphical output generator 108 may generate a graphical representation that excludes some or all of the identified sub-items. The generated graphical representation may comprise an alert to a user viewing the graphical representation that a threshold number of sub-items have been identified. If the number of identified sub-items exceeds the threshold, graphical output generator 108 may generate a graphical representation that includes some or all of the identified sub-items and/or the item to which the sub-items belong. Graphical output generator 108 may also include an indication in the graphical representation that the threshold number of sub-items have been identified.

In a related implementation, classification engine 104 and/or graphical output generator 108 may generate a graphical representation based on historical information related to identified items or sub-items. More particularly, classification engine 104 and/or graphical output generator 108 may maintain a history of identified items and sub-items. The history may include a number of times a given item or sequence of items was identified. In some examples, one of detection devices 102 may transmit data related to the history to another one of detection devices 102 or classification engine 104. Computing system 100 may maintain a synchronized history based on the history data.

The history may also comprise temporal information related to the identification of an item. The temporal information may indicate, for example, a frequency that a given item or class of items are identified. Historical information may be defined in various other manners as well. Graphical output generator 108 may generate a graphical representation based on the historical information. For example, graphical output generator 108 may include a representation of a given item if an item has been identified a given number of times based on the historical data. As another example, graphical output generator 108 may generate a graphical representation if an item's identification frequency exceeds a threshold item frequency. Various other examples of generating graphical representations based on historical identification data are possible as well.

E. Identifying Threats Based on Combinations of Items and/or Sub-Items

In another aspect of this disclosure, a computing system as described herein may be configured to determine that combinations of items and/or sub-items may pose a threat, and may generate graphical representations based on the determination. Various implementations will now be described.

Figure 15:
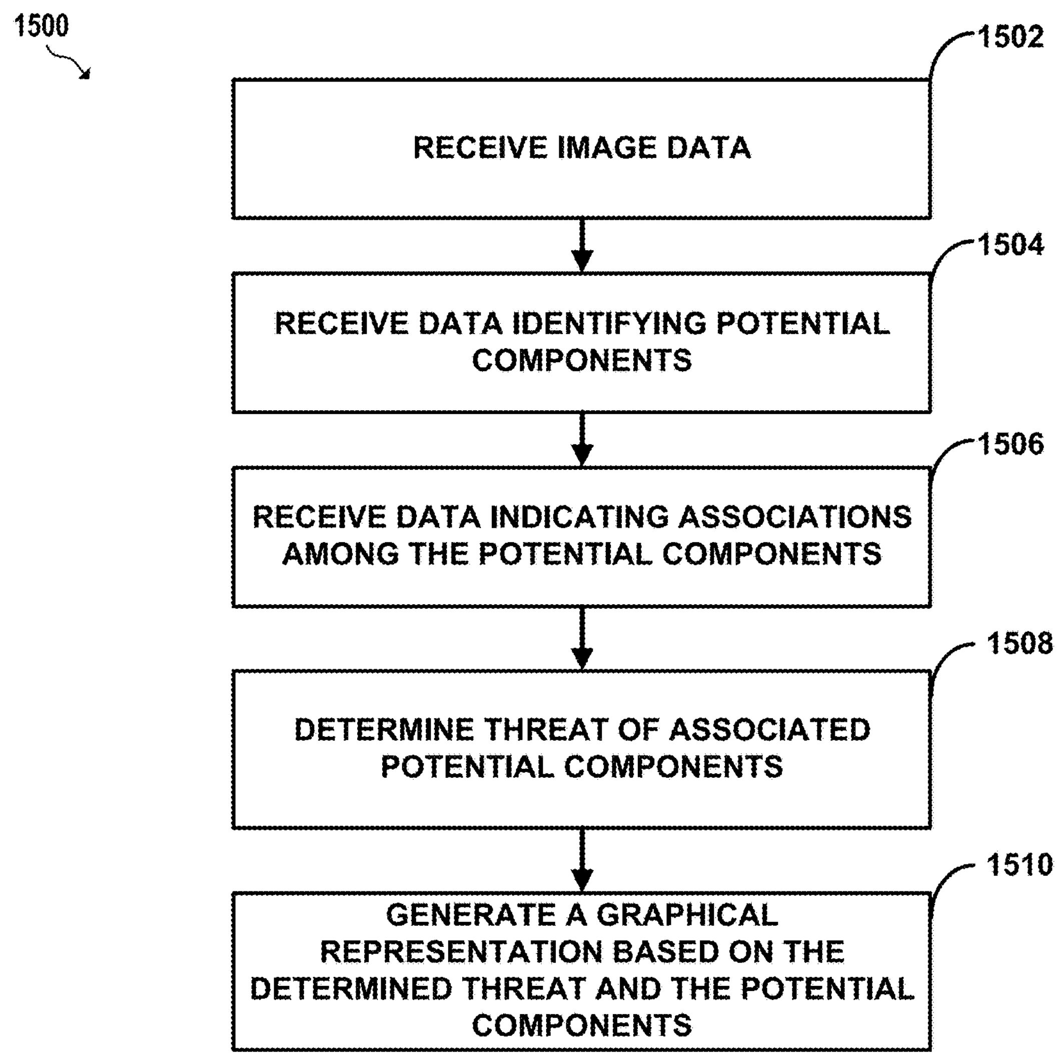
FIG. 15 is an example flow diagram illustrating operations for generating graphical output based on identified combinations of items and/or sub-items.

FIG. 15 is an example flow diagram illustrating operations for generating graphical output based on identified combinations of items and/or sub-items. To help describe some of these operations, flow diagrams may be referenced to describe combinations of operations that may be performed. In some cases, each block may represent a module or portion of program code that includes instructions that are executable by a processor to implement specific logical functions or steps in a process. The program code may be stored on any type of computer-readable medium, such as non-transitory computer-readable media. In other cases, each block may represent circuitry that is wired to perform specific logical functions or steps in a process. Moreover, the blocks shown in the flow diagrams may be rearranged into different orders, combined into fewer blocks, separated into additional blocks, and/or removed based upon the particular embodiment.

As noted above, disclosed herein is a computer system that is configured to generate graphical output based on identified combinations of items and/or sub-items. For purposes of illustration, the example functions are described below as being carried out by computer system 100 of FIG. 1, but it should be understood that various other devices, systems, and/or platforms may perform the example functions.

In the example of FIG. 15, a computer system may perform the blocks illustrated in method 1500. At block 1502, graphical output generator 108 may receive digital image data. The digital image data may comprise one or more 2-D or 3-D images that represent one or more objects scanned by one or more detection devices, e.g. one or more of detection devices 102.

Graphical output generator 108 may receive the digital image data from classification engine 104, which may in turn receive the digital image from one of detection devices 102.

At block 1504, graphical output generator 108 may receive data identifying potential components. Components may comprise items or sub-items may be part of an item, may be combined with each other to form an item, or associated with each other. In some instances, a component may comprise an item or sub-item that computing system 100 determines is altered or missing from a given item. As an example, a trigger may be a sub-item comprising a component of a gun item. As another example, a blade from a first knife and a handle from a second, different knife may each comprise components that can be combined to form an improvised knife. The blade and handle may comprise components even though the blade and handle may not have originally been designed to function together as part of the improvised knife. Similarly, explosives or a 9-volt battery may comprise a component of a laptop bomb even though the explosives or battery were not originally designed to work in conjunction with a laptop. Components may take various other forms as well.

Graphical output generator 108 may receive data identifying potential components from classification engine 104, item database 106, and/or policy engine 110, as some examples. The data that identifies potential components may comprise data such as identification data, geometry data, classification data, metadata, and the like for each component.

At block 1506, graphical output generator 108 may receive data indicating associations among the potential components. The received association data may indicate whether two or more given components may be associated with each other, e.g. combined, associated, utilized in combination, or the like, with each other. In some instances, graphical output generator 108 may receive the association data from, e.g. classification engine 104, policy engine 110, item database 106, external data sources 128, or the like. In various instances, graphical output generator 108 may determine the associations between the potential components based on received association data.

In some implementations, computing system 100 may determine whether components may be associated with each other based on classification data. As an example, if two identified components belong to a same class, computing system 100 may determine that the identified components of the same class are associated. Referring to some above examples described above, classification engine 104 may identify a battery and a motherboard, both of which may comprise components belonging to a laptop class. Because the battery and motherboard belong to a same class, classification engine 104 may associate the laptop and battery components with each other. Responsive to associating the battery and motherboard, classification engine 104 may transmit data indicating the association to graphical output generator 108.

In some implementations, computing system 100 may determine that given identified components are associated with each other if the given components can be combined with each other in some fashion. As examples, classification engine 104 may determine that an explosive and a laptop may be combined with each other to form a bomb, or that a blade may combined with any of various identified potential components to form a knife or another weapon. Various other examples of potential components that may be combined with each other are also possible.

In some examples, classification engine 104, graphical output generator 108 or another component of computer system 100 may determine whether different combinations of identified components may form an item. Responsive to determining that a combination of components forms an item, graphical output generator 108 may generate a graphical representation of the combination as described herein.

At block 1508, graphical output generator 108 or another component of computing system 100 may determine a threat of a given set of components that are associated with each other. Graphical output generator 108 may determine the threat based on threat data from policy database 110, and/or item database 106, as examples. In some examples, graphical output generator 108 may determine the threat by averaging the threat of each of the non-combined components or taking the highest threat of a given set of components. In other examples, graphical output generator 108 may determine the threat for a set of components as the maximum threat of any of the components or the item which the components may combine to form. In still other examples, graphical output generator 108 may determine combinations of safe items that, when combined pose a threat. Graphical output generator 108 may determine threat for a potential set of components in various other forms as well.

At block 1510, graphical output generator 108 may generate a graphical representation based on the determined threat and the potential components. Visual output generator 108 may generate a graphical representation based on the determined threat and the potential components in various manners. In one implementation, graphical output generator 108 may determine if potential components, when combined or associated, will have a higher threat than if the components were separated. If the potential components may have a higher threat when combined or associated, graphical output generator 108 may generate a graphical representation that identifies the identified potential components. In another implementation, graphical output generator 108 may determine if potential components that are determined to be safe when uncombined, pose a threat when combined, and may generate a graphical representation indicating the potentially threatening combination.

The graphical representation generated by graphical output generator 108 as part of performing the techniques of block 1508 may indicate information such as an item that the components may form, the threat levels associated with the combination, the respective threat levels associated with each of the components if uncombined and/or combined, as some examples.

In an implementation, graphical output generator 108 may generate a graphical representation comprising an image of a given item which a given set of identified components may form when combined or associated. The generated graphical representation may contain indications emphasizing the respective locations of the identified components within the a given item that the components may be combined to form. The graphical representation may also include a representation of the given item, or a representation of a class of item that the components may be combined to form.

As an example, graphical output generator 108 may identify components comprising a gun barrel and a gun stock, and may determine that the gun barrel and gun stock may be components of a same gun. As part of generating a graphical representation, graphical output generator 108 may generate a representation of the gun, which the identified components may be combined to form. The representation of the gun may, for example, highlight, indicate, and/or emphasize locations of the gun barrel and stock, and/or may include representation of the gun stock and barrel within the representation of the gun. In various examples, the graphical representation may indicate where the components belong or fit within a given item that the components may form. In various examples, graphical output generator 108 may generate a graphical representation comprising the identified components and including previously-stored images of the identified components. The stored representations of the identified components may, e.g. have better image quality than an image captured image of a given component from which the given component was identified.

In some aspects of this disclosure, certain components of an identified item or sub-item may be conspicuously missing from a given item, or may appear to have been altered. Responsive to determining that a component is absent from a given item or altered, graphical output generator 108 may determine whether the absence or alteration of the given component poses a threat or increases a threat level of the given item based on policy data, e.g. from item database 106. Responsive to determining a threat for a given missing or altered component, graphical output generator 108 may generate a graphical representation based on the determination. As examples, if graphical output generator 108 determines or receives information indicating that a battery component of a laptop is missing or altered, graphical output generator 108 may generate a graphical representation comprising the laptop that may emphasize the missing or altered battery component.

In various aspects of this disclosure, graphical output generator 108 may generate graphical representations comprising images of components that are similar to the components that were previously identified. As an example, if graphical output generator 108 identifies a gun barrel and a gun stock, graphical output generator 108 may generate a graphical representation comprising one or more images of items similar to the gun barrel and stock, such as a trigger for the gun, ammunition, or other firearm-related components. The graphical representation that contains images or representations of similar components to already-identified components may aid or cue a user viewing the graphical representation in looking for the related components. In various examples, graphical output generator 108 may generate 2-D or 3-D representations of the identified components, related components and/or the items that they may combine to form.

In some implementations, graphical output generator 108 may output a graphical representation based on whether a partial set of components has been identified. A partial set of components has been identified which, if combined with additional items which have not yet been identified, may pose a threat. Graphical output generator 108 may determine whether a partial set of components has been identified based on received item data. In some examples, the generated graphical representation may indicate that not all components of the set have been identified. The graphical representation may cue security personnel to look for other components of the set that have not been identified, and/or may include one or more indications of missing components of the set. In another example, Graphical output generator 108 may generate the graphical representation based on a partial set of identified components in various other manners as well.

In an implementation, graphical output generator 108 may output a graphical representation based on whether an inexact set of components has been identified. An inexact set is a set of components which may not combine exactly to form a given item or class of item. However, if the inexact set of items were modified, the combination of the inexact set of items may pose a threat. As an example, an inexact set may comprise a barrel from one model of firearm and a stock from another model of firearm. Graphical output generator 108 may determine whether an inexact set of components has been identified based on received item data. In some examples, the generated graphical representation may indicate that not all components of the inexact set have been identified, one or more items the that components of inexact set may be combined to form, and/or potential modifications that may be performed on the components of the inexact set. The graphical representation may cue a user to look for other components of the inexact set that have not been identified, and/or may include one or more indications of missing components of the set. In another example, Graphical output generator 108 may generate the graphical representation based on an inexact set of identified components in various other manners as well.

In some other aspects of this disclosure, classification engine 104 and/or visual output generator 108 may determine statistics about identified and/or missing components. The determined statistics may take various other forms as well. As examples, classification engine 104 may track frequencies with which certain components, items, subitems, missing components, or the like are present or absent in scanned objects or scenes. The statistics may be stored locally or remotely or a combination thereof. In various examples, classification engine 104 and/or graphical output generator 108 may use the statistics to perform various techniques, such as classification and identification of items, and generation of graphical representations. In some examples, computing system 100 may output the determined statistics in computer-readable and/or human-readable forms. The captured statistical data may be used in other various manners as well.

Figure 16:
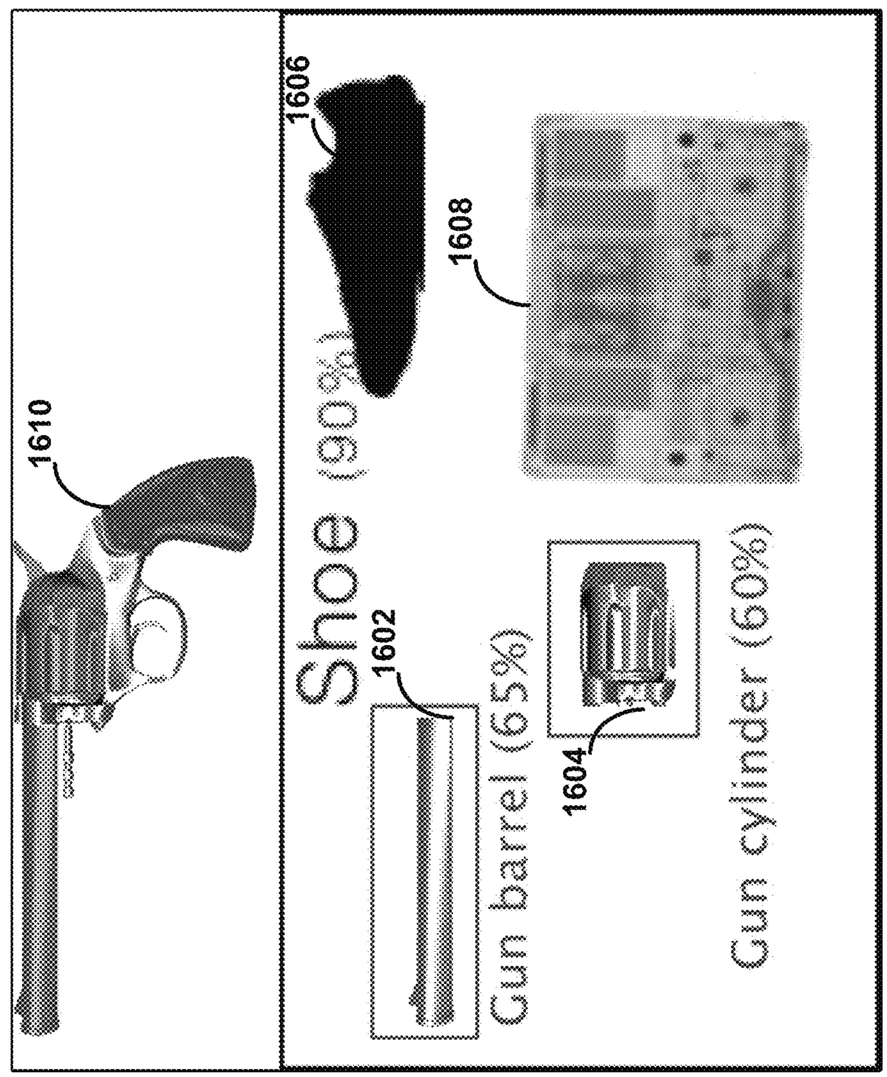
FIG. 16 is a conceptual diagram illustrating an example of determining components that may be associated with each other.

FIG. 16 is a conceptual diagram illustrating an example of determining components that may be associated with each other. FIG. 16 illustrates a graphical representation 1600. Before generating graphical representation 1600, graphical output generator 108 receives data about objects identified from image data, e.g. a gun barrel 1602, a gun cylinder 1604, a shoe 1606, and a laptop 1608. Gun barrel 1602, gun cylinder 1604, shoe 1606, and laptop 1608 may have been identified by classification engine 104 in multiple objects or a single object, and using multiple detection devices or a single detection device.

Graphical output generator 108 may receive information indicating that gun barrel 1602 and gun cylinder 1604 have been identified, and are associated. Gun barrel 1602 and gun cylinder 1604 may be associated because they can be combined, may be part of a same class, such as firearm class, or may be associated based on other criteria. Graphical output generator 108 may not be associated with any other items, and therefore graphical output generator 108 may not receive information indicating that shoe 1606 is associated with any other identified items.

Based on the determination that gun barrel 1602 and gun cylinder 1604 are associated with each other, graphical output generator 108 may determine a threat associated with each of gun barrel 1602, gun cylinder 1604, shoe 1606, and laptop 1608. Graphical output generator 108 may also determine a threat associated with a gun 1610 formed by the combination of gun barrel 1602 and gun cylinder 1604. As an example, graphical output generator 108 may determine that gun barrel 1602 and gun cylinder 1604 may be safe if uncombined, but that the combination of gun barrel 1602 and gun cylinder 1604 may be unsafe if combined, and may pose a threat.

Based on the identified items, components and combinations of components, graphical output generator 108 generate graphical representation 1600. Based on the determination that the combination of gun barrel 1602 and gun cylinder 1604 may pose a threat, graphical output generator 108 may generate an image of gun 1610 to which gun barrel 1602 and gun cylinder 1604 may be combined to form. In some examples, the image of gun 1610 included in graphical representation 1600 may comprise a previously-stored image from a class of which gun barrel 1602 and gun cylinder 1604 may be components. In the example of FIG. 16, graphical output generator 108 also indicates locations where gun barrel 1602 and gun cylinder 1604 may be located within gun 1610. Graphical output generator 108 may also emphasize regions associated with gun barrel 1602 and gun cylinder 1604 in graphical representation 1600

It should be understood that graphical output generator 108 may generate graphical representations in various other manners as well.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

What is claimed is:

1. A method comprising:

based on a set of training image data, training at least one neural network for identification of items deemed to be of interest, wherein at least one training image data of the set of training image data comprises an item that has been deemed to be of interest;

receiving, from a detection device of a particular security screening system, image data that represents an object scanned by the detection device;

based at least on the image data and the at least one neural network:

identifying one or more regions of interest within the image data, wherein each region of interest has a likelihood of comprising an item of interest that exceeds a threshold likelihood;

for each given region of interest, generating a vector-space representation corresponding to the given region of interest based on image data within the given region of interest; and based on one or more vector-space representations and a confidence threshold defined for the particular security screening system that is utilized by the at least one neural network, determining that at least one region of interest of the one or more regions of interest comprises an identified item that has been deemed to be of interest for the particular security screening system; and based at least on (i) determining that the at least one region of interest comprises the identified item that has been deemed to be of interest for the particular security screening system and (ii) one or more security parameters for the particular security screening system, determining that the identified item is deemed to be a security interest for the particular security screening system;

based at least on determining that the identified item is deemed to be a security interest for the particular security screening system, presenting, at a display of a computing device of the security screening system, a visualization corresponding to the identified item.

2. The method of claim 1, wherein training the at least one neural network for identification of items deemed to be of interest comprises defining one or more parameters of the at least one neural network based on the set of training image data, wherein each of the one or more parameters comprises a kernel parameter, a weighting parameter, or a matrix parameter.

3. The method of claim 1, wherein training the at least one neural network for identification of items deemed to be of interest comprises, based on the set of training image data, training the at least one neural network for identification of items deemed to be of interest, wherein each of the items deemed to be of interest comprises a component of an item that has been deemed to be of interest, and wherein the at least one training image data of the set of training image data comprises a component of an item that has been deemed to be of interest.

4. The method of claim 3, wherein determining that the at least one region of interest of the one or more regions of interest comprises an identified item that has been deemed to be of interest comprises, based on one or more vector-space representations, determining that the at least one region of interest of the one or more regions of interest comprises an identified component of an item that has been deemed to be of interest.

5. The method of claim 4, wherein presenting the visualization corresponding to the identified item comprises, based at least on determining that the identified component is of an item deemed to be a security interest for the particular security screening system, presenting, at the display of the computing device of the security screening system, a visualization of the identified component of the item.

6. A computing system comprising:

at least one processor;

a non-transitory computer-readable medium; and program instructions stored on the non-transitory computer-readable medium that are executable by the at least one processor to cause the computing system to:

based on a set of training image data, train at least one neural network for identification of items deemed to be of interest, wherein at least one training image data of the set of training image data comprises an item that has been deemed to be of interest;

receive, from a detection device of a particular security screening system, image data that represents an object scanned by the detection device;

based at least on the image data and the at least one neural network:

identify one or more regions of interest within the image data, wherein each region of interest has a likelihood of comprising an item of interest that exceeds a threshold likelihood;

for each given region of interest, generate a vector-space representation corresponding to the given region of interest based on image data within the given region of interest; and based on one or more vector-space representations and a confidence threshold defined for the particular security screening system that is utilized by the at least one neural network, determine that at least one region of interest of the one or more regions of interest comprises an identified item that has been deemed to be of interest for the particular security screening system; and based at least on (i) determining that the at least one region of interest comprises the identified item that has been deemed to be of interest for the particular security screening system and (ii) one or more security parameters for the particular security screening system, determine that the identified item is deemed to be a security interest for the particular security screening system;

based at least on determining that the identified item is deemed to be a security interest for the particular security screening system, present, at a display of a computing device of the security screening system, a visualization corresponding to the identified item.

7. The computing system of claim 6, wherein the program instructions that are executable by the at least one processor to cause the computing system to train at least one neural network for identification of items deemed to be of interest comprise program instructions stored on the non-transitory computer-readable medium that are executable by the at least one processor to cause the computing system to:

define one or more parameters of the at least one neural network based on the set of training image data, wherein each of the one or more parameters comprises a kernel parameter, a weighting parameter, or a matrix parameter.

8. The computing system of claim 6, wherein the at least one neural network comprises at least one set of layers comprising a convolutional layer and a pooling layer.

9. The computing system of claim 6, wherein the program instructions that are executable by the at least one processor to cause the computing system to train at least one neural network for identification of items deemed to be of interest comprise program instructions stored on the non-transitory computer-readable medium that are executable by the at least one processor to cause the computing system to:

based on the set of training image data, train the at least one neural network for identification of items deemed to be of interest, wherein each of the items deemed to be of interest comprises a component of an item that has been deemed to be of interest, and wherein the at least one training image data of the set of training image data comprises a component of an item that has been deemed to be of interest.

10. The computing system of claim 9, wherein the program instructions that are executable by the at least one processor to cause the computing system to determine that at least one region of interest of the one or more regions of interest comprises an identified item that has been deemed to be of interest comprise program instructions stored on the non-transitory computer-readable medium that are executable by the at least one processor to cause the computing system to:

based on one or more vector-space representations, determine that the at least one region of interest of the one or more regions of interest comprises an identified component of an item that has been deemed to be of interest.

11. The computing system of claim 10, wherein the program instructions that are executable by the at least one processor to cause the computing system to present a visualization corresponding to the identified item comprise program instructions stored on the non-transitory computer-readable medium that are executable by the at least one processor to cause the computing system to:

based at least on determining that the identified component is of an item deemed to be a security interest for the particular security screening system, present, at the display of the computing device of the security screening system, a visualization of the identified component of the item.

12. The computing system of claim 10, wherein the at least one neural network is a first neural network, wherein the component of the item is a first component of the item, wherein the identified component of the item is a first identified component of the item, and further comprising program instructions stored on the non-transitory computer-readable medium that are executable by the at least one processor to cause the computing system to:

based on determining that the at least one region of interest of the one or more regions of interest comprises the first identified component of the item that has been deemed to be of interest, select a second neural network trained for identification of at least one second component of the item that has been deemed to be of interest; and based at least on the image data, execute the selected second neural network, wherein executing the selected second neural network comprises making a determination that the image data comprises a second identified component of the item that has been deemed to be of interest.

13. The computing system of claim 12, wherein the program instructions that are executable by the at least one processor to cause the computing system to present a visualization corresponding to the identified item comprise program instructions stored on the non-transitory computer-readable medium that are executable by the at least one processor to cause the computing system to:

based at least on executing the selected second neural network, present, at the display of the computing device of the security screening system, a visualization corresponding to the first and second identified components of the item.

14. A tangible, non-transitory computer-readable medium comprising program instructions that, when executed by at least one processor, cause a computing system to:

based on a set of training image data, train at least one neural network for identification of items deemed to be of interest, wherein at least one training image data of the set of training image data comprises an item that has been deemed to be of interest;

receive, from a detection device of a particular security screening system, image data that represents an object scanned by the detection device;

based at least on the image data and the at least one neural network:

identify one or more regions of interest within the image data, wherein each region of interest has a likelihood of comprising an item of interest that exceeds a threshold likelihood;

for each given region of interest, generate a vector-space representation corresponding to the given region of interest based on image data within the given region of interest; and based on one or more vector-space representations and a confidence threshold defined for the particular security screening system that is utilized by the at least one neural network, determine that at least one region of interest of the one or more regions of interest comprises an identified item that has been deemed to be of interest for the particular security screening system; and based at least on (i) determining that the at least one region of interest comprises the identified item that has been deemed to be of interest for the particular security screening system and (ii) one or more security parameters for the particular security screening system, determine that the identified item is deemed to be a security interest for the particular security screening system;

based at least on determining that the identified item is deemed to be a security interest for the particular security screening system, present, at a display of a computing device of the security screening system, a visualization corresponding to the identified item.

15. The non-transitory computer-readable medium of claim 14, wherein the program instructions that, when executed by the at least one processor, cause the computing system to train at least one neural network for identification of items deemed to be of interest comprise program instructions that, when executed by the at least one processor, cause the computing system to:

define one or more parameters of the at least one neural network based on the set of training image data, wherein each of the one or more parameters comprises a kernel parameter, a weighting parameter, or a matrix parameter.

16. The non-transitory computer-readable medium of claim 14, wherein the program instructions that, when executed by the at least one processor, cause the computing system to train at least one neural network for identification of items deemed to be of interest comprise program instructions that, when executed by the at least one processor, cause the computing system to:

based on the set of training image data, train the at least one neural network for identification of items deemed to be of interest, wherein each of the items deemed to be of interest comprises a component of an item that has been deemed to be of interest, and wherein the at least one training image data of the set of training image data comprises a component of an item that has been deemed to be of interest.

17. The non-transitory computer-readable medium of claim 16, wherein the program instructions that, when executed by the at least one processor, cause the computing system to determine that at least one region of interest of the one or more regions of interest comprises an identified item that has been deemed to be of interest comprise program instructions that, when executed by the at least one processor, cause the computing system to:

based on one or more vector-space representations, determine that the at least one region of interest of the one or more regions of interest comprises an identified component of an item that has been deemed to be of interest.

18. The non-transitory computer-readable medium of claim 17, wherein the program instructions that, when executed by the at least one processor, cause the computing system to present a visualization corresponding to the identified item comprise program instructions that, when executed by the at least one processor, cause the computing system to:

based at least on determining that the identified component is of an item deemed to be a security interest for the particular security screening system, present, at the display of the computing device of the security screening system, a visualization of the identified component of the item.

19. The non-transitory computer-readable medium of claim 17, wherein the at least one neural network is a first neural network, wherein the component of the item is a first component of the item, wherein the identified component of the item is a first identified component of the item, and further comprising program instructions that, when executed by the at least one processor, cause the computing system to:

based on determining that the at least one region of interest of the one or more regions of interest comprises the first identified component of the item that has been deemed to be of interest, select a second neural network trained for identification of at least one second component of the item that has been deemed to be of interest; and based at least on the image data, execute the selected second neural network, wherein executing the selected second neural network comprises making a determination that the image data comprises a second identified component of the item that has been deemed to be of interest.

20. The non-transitory computer-readable medium of claim 19, wherein the program instructions that, when executed by the at least one processor, cause the computing system to present a graphical representation corresponding to the identified item comprise program instructions that, when executed by the at least one processor, cause the computing system to:

based at least on executing the selected second neural network, present, at the display of the computing device of the security screening system, a visualization corresponding to the first and second identified components of the item.

* * * * *